United States Patent
Taku et al.

(10) Patent No.: US 11,710,837 B2
(45) Date of Patent: Jul. 25, 2023

(54) FUEL CELL SYSTEM INCLUDING A SEPARATION MEMBRANE

(71) Applicant: Tokyo Gas Co., Ltd., Tokyo (JP)

(72) Inventors: Shunpei Taku, Tokyo (JP); Kazuo Nakamura, Tokyo (JP); Tatsuki Dohkoh, Tokyo (JP)

(73) Assignee: TOKYO GAS CO., LTD., Tokyo (JP)

(*) Notice: Subject to any disclaimer, the term of this patent is extended or adjusted under 35 U.S.C. 154(b) by 479 days.

(21) Appl. No.: 16/463,882

(22) PCT Filed: Nov. 7, 2017

(86) PCT No.: PCT/JP2017/040107
§ 371 (c)(1),
(2) Date: May 24, 2019

(87) PCT Pub. No.: WO2018/096922
PCT Pub. Date: May 31, 2018

(65) Prior Publication Data
US 2019/0296375 A1    Sep. 26, 2019

(30) Foreign Application Priority Data
Nov. 24, 2016  (JP) ................. 2016-227852

(51) Int. Cl.
*H01M 8/0202*    (2016.01)
*H01M 8/0612*    (2016.01)
(Continued)

(52) U.S. Cl.
CPC ......... *H01M 8/04156* (2013.01); *H01M 8/00* (2013.01); *H01M 8/0202* (2013.01);
(Continued)

(58) Field of Classification Search
CPC ...... H01M 8/04156; H01M 8/04; H01M 8/00; H01M 8/0202; H01M 8/04022;
(Continued)

(56) References Cited

U.S. PATENT DOCUMENTS

2008/0318098 A1* 12/2008 Matsunaga ....... H01M 8/04089
429/415
2013/0108936 A1    5/2013 McElroy et al.
(Continued)

FOREIGN PATENT DOCUMENTS

DE    102013009244 A1 * 12/2014 ............. H01M 8/06
JP       2015201266       11/2015
(Continued)

OTHER PUBLICATIONS

Machine translation of JP 2016184503A, Taku Shunpei, 2016 (Year: 2016).*

(Continued)

*Primary Examiner* — Kwang Han
(74) *Attorney, Agent, or Firm* — Dority & Manning, P.A.

(57) ABSTRACT

A fuel cell system including: a first fuel cell performing power generation using a fuel gas; a separation membrane separating at least one of carbon dioxide or water vapor from an anode off gas discharged from the first fuel cell; a second fuel cell disposed in the downstream of the separation membrane and performing power generation using the anode off gas, the anode off gas having at least one of carbon dioxide or water vapor separated therefrom; and a distribution channel disposed on a permeation side of the separation membrane and distributing any of the following: a raw material gas serving as the fuel gas to be reformed and used for the power generation of the first fuel cell, a cathode gas including oxygen to be used for the power generation of the first fuel cell, an anode off gas discharged from the second (Continued)

fuel cell, a cathode off gas discharged from the first fuel cell and to be supplied to the second fuel cell, or a cathode off gas discharged from the second fuel cell, in which at least one of permeability coefficient ratio $\alpha 1$ of the separation membrane or permeability coefficient ratio $\alpha 2$ of the separation membrane is 30 or higher.

14 Claims, 12 Drawing Sheets

(51) Int. Cl.
  *H01M 8/0668* (2016.01)
  *H01M 8/04* (2016.01)
  *H01M 8/04119* (2016.01)
  *H01M 8/04014* (2016.01)
  *H01M 8/12* (2016.01)
  *H01M 8/00* (2016.01)
(52) U.S. Cl.
  CPC ......... *H01M 8/04* (2013.01); *H01M 8/04022* (2013.01); *H01M 8/0618* (2013.01); *H01M 8/0668* (2013.01); *H01M 8/12* (2013.01); *H01M 2008/1293* (2013.01); *Y02P 70/50* (2015.11)
(58) Field of Classification Search
  CPC .... H01M 8/0618; H01M 8/0668; H01M 8/12; H01M 2008/1293; H01M 8/04097; H01M 8/04216; H01M 8/2457; H01M 8/244; H01M 8/2425; H01M 2008/147; H01M 8/04694; H01M 8/04089; H01M 8/0662; H01M 8/0687; H01M 8/249; Y02P 70/50; Y02E 60/50
  See application file for complete search history.

(56) References Cited

U.S. PATENT DOCUMENTS

2016/0248111 A1\* 8/2016 Gasda ............... H01M 8/04791
2016/0355933 A1\* 12/2016 Diethelm .................. C25B 5/00

FOREIGN PATENT DOCUMENTS

| | | | |
|---|---|---|---|
| JP | 2016115495 | 6/2016 | |
| JP | 2016115496 | 6/2016 | |
| JP | 2016184502 | 10/2016 | |
| JP | 2016184503 | 10/2016 | |
| JP | 2016184504 | 10/2016 | |
| KR | 10-0795883 | 1/2008 | |
| TW | I557980 B | \* 11/2016 | ............. Y02E 60/50 |

OTHER PUBLICATIONS

Machine translation of TWI557980B, Chang et al., 2016 (Year: 2016).\*
Machine translation of DE 102013009244A1, Leithner et al., 2014 (Year: 2014).\*
U. K. Office Action for corresponding U.K. Application No. GB1908209.8, dated Aug. 24, 2021, 4 pages.

\* cited by examiner

FUEL CELL SYSTEM INCLUDING A SEPARATION MEMBRANE

TECHNICAL FIELD

The present invention relates to a fuel cell system.

BACKGROUND ART

In regard to high temperature operation fuel cell systems such as a solid oxide fuel cell or a molten carbonate fuel cell, which usually operate at a temperature of 600° C. or higher, investigations have been conducted to reuse anode exhaust gases that are discharged from anodes of high temperature operation fuel cells in order to promote efficiency increase. For example, several technologies for increasing the fuel utilization rate of an entire system by eliminating carbon dioxide or water vapor in the anode exhaust gas and reutilizing the gas have been suggested. Furthermore, several techniques for eliminating carbon dioxide or water vapor from an anode exhaust gas using a separation membrane have also been suggested.

For example, there has been suggested a fuel cell power generation system that includes a first fuel cell stack; a first carbon dioxide removing apparatus; and a second fuel cell stack, in which a sub-nano ceramic membrane filter is used as the first carbon dioxide removal apparatus for removing carbon dioxide in the exhaust gas supplied to the second fuel cell stack (see, for example, Patent Document 1).

Furthermore, there has been suggested a multi-stage fuel cell system including a first fuel cell, a water vapor separation membrane, and a second fuel cell, by which water vapor is removed in a gas state from an off gas including unreacted fuel gas discharged from the first fuel cell, by the water vapor separation membrane, and power generation is carried out with the second fuel cell using a regenerated fuel gas obtained by removing water vapor from the off gas (see, for example, Patent Document 2).

There has also been suggested a circulation fuel cell system including a fuel cell; a water vapor separation membrane; and a regenerated fuel gas channel, by which water vapor is removed in a gas state from an off gas including unreacted fuel gas discharged from the fuel cell, by the water vapor separation membrane, a regenerated fuel gas obtained by removing water vapor from the off gas is supplied to the fuel cell through the regenerated fuel gas channel, and power generation is carried out (see, for example, Patent Document 3).

In addition to that, a circulation fuel cell system that removes carbon dioxide or water vapor in an anode exhaust gas using a separation membrane has been suggested. For example, a circulation fuel cell system employing a method of removing carbon dioxide or water vapor in an anode exhaust gas by supplying air to the permeation side of the separation membrane, or a method of reducing the pressure on the permeation side of the separation membrane using a vacuum pump, and thereby removing carbon dioxide or water vapor in the anode exhaust gas, has been suggested (see, for example, Patent Document 4).

CITED REFERENCES

Patent Document 1: Japanese Patent Application Laid-Open (JP-A) No. 2015-201266
Patent Document 2: JP-A No. 2016-115495
Patent Document 3: JP-A No. 2016-115496
Patent Document 4: US Patent Application Publication No. 2013/0108936

SUMMARY OF INVENTION

Technical Problem

It is described in Patent Documents 1 to 4 that the power generation efficiency of the system is increased by removing at least one of carbon dioxide or water vapor in the anode exhaust gas using a separation membrane and thus increasing the concentration of hydrogen or carbon monoxide as a fuel. However, in general separation membranes, it is difficult not to allow 100% permeation of hydrogen, and some of hydrogen included in the anode exhaust gas permeates through the membrane. Therefore, the amount of fuel that can be reutilized is reduced by permeation of hydrogen, and there is a risk that the power generation efficiency of the system may be lowered. However, nothing is considered in this regard in Patent Documents 1 to 4. It is preferable that after taking into account the influence of lowering of the power generation efficiency of a system caused by hydrogen permeating through a separation membrane, the power generation efficiency of the whole system is increased by setting the ratio between the permeability of at least one of carbon dioxide or water vapor and the permeability of hydrogen (permeability coefficient ratio) for the separation membrane to an appropriate range.

It is an object of the present invention to provide a fuel cell system having excellent overall power generation efficiency of the system by setting the ratio between the permeability of at least one of carbon dioxide or water vapor and the permeability of hydrogen for a separation membrane to an appropriate range.

Solution to Problem

The above-described object is addressed by, for example, the following means.

<1> A fuel cell system comprising: a first fuel cell performing power generation using a fuel gas; a separation membrane separating at least one of carbon dioxide or water vapor from an anode off gas discharged from the first fuel cell, the anode off gas including an unreacted portion of the fuel gas; a second fuel cell disposed in the downstream of the separation membrane and performing power generation using the anode off gas, the anode off gas having at least one of carbon dioxide or water vapor separated therefrom; and a distribution channel disposed on a permeation side of the separation membrane and distributing any of the following: a raw material gas serving as the fuel gas to be used for the power generation of the first fuel cell, a cathode gas including oxygen to be used for the power generation of the first fuel cell, an anode off gas discharged from the second fuel cell, a cathode off gas discharged from the first fuel cell and to be supplied to the second fuel cell, or a cathode off gas discharged from the second fuel cell, in which the at least one of permeability coefficient ratio α1 ($P_{CO2}/P_{H2}$) of the separation membrane or permeability coefficient ratio α2 ($P_{H2O}/P_{H2}$) of the separation membrane is 30 or higher.

Since the fuel cell system according to the present embodiment is a multi-stage type fuel cell system including a first fuel cell and a second fuel cell, the fuel utilization rate is increased compared to a circulation type fuel cell system, and high power generation efficiency can be obtained.

Since at least one of carbon dioxide or water vapor separated by the separation membrane is distributed in the distribution channel disposed on the permeation side of the separation membrane, the distribution channel having any one of the above-mentioned gases distributed therein, at least one of carbon dioxide or water vapor thus separated circulates in the distribution channel together with any one of the above-mentioned gases that circulates in the distribution channel. Therefore, separation of at least one of carbon dioxide or water vapor can be promoted without separately providing a channel for supplying a sweep gas such as air to the permeation side of the separation membrane, and an air blower or a reduced pressure pump. Therefore, the overall power generation efficiency of the system can be increased while the production cost is reduced, and since the system is simplified, reliability of the system is enhanced.

Here, it is contemplated that by separating at least one of carbon dioxide or water vapor from the anode off gas that is discharged from the first fuel cell and includes unreacted fuel gas, the concentration of fuel gas such as hydrogen or carbon monoxide is increased, and thus the power generation efficiency of the system can be enhanced. However, in conventional separation membranes, since hydrogen that is included in the anode off gas together with at least one of carbon dioxide or water vapor is separated, there is a risk that the power generation efficiency of the system may be decreased by reduction of hydrogen as a fuel gas.

On the other hand, in the fuel cell system according to the present embodiment, at least one of the permeability coefficient ratio α1 ($P_{CO2}/P_{H2}$) or the permeability coefficient ratio α2 ($P_{H2O}/P_{H2}$) is 30 or higher. Therefore, the influence of the effect of increasing the power generation efficiency of the system caused by at least one of carbon dioxide or water vapor permeating through the separation membrane becomes greater than the influence of the decrease in the power generation efficiency of the system caused by hydrogen permeating through the separation membrane, and the overall power generation efficiency of the system is excellent.

<2> A fuel cell system comprising: a fuel cell performing power generation using a fuel gas; a separation membrane separating at least one of carbon dioxide or water vapor from an anode off gas discharged from the fuel cell, the anode off gas including an unreacted portion of the fuel gas; an off gas circulation channel disposed in the downstream of the separation membrane and supplying the anode off gas to the fuel cell, the anode off gas having at least one of carbon dioxide or water vapor separated therefrom; and a distribution channel disposed on a permeation side of the separation membrane and distributing any of the following: a raw material gas serving as the fuel gas to be used for power generation of the fuel cell, a cathode gas including oxygen to be used for power generation of the fuel cell, or a cathode off gas discharged from the fuel cell, in which at least one of permeability coefficient ratio α1 ($P_{CO2}/P_{H2}$) of the separation membrane or permeability coefficient ratio α2 ($P_{H2O}/P_{H2}$) of the separation membrane is 30 or higher.

The fuel cell system according to the present embodiment is a circulation type fuel cell system supplying an anode off gas having at least one of carbon dioxide or water vapor separated therefrom, and even with such a system, the fuel utilization rate is increased, and high power generation efficiency can be obtained. The fuel cell system according to the present embodiment can promote separation of at least one of carbon dioxide or water vapor, without separately providing a channel for supplying a sweep gas such as air to the permeation side of the separation membrane, and an air blower or a reduced pressure, similarly to the fuel cell system described above. Therefore, the overall power generation efficiency of the system can be increased while the production cost is reduced, and since the system is simplified, reliability of the system is enhanced.

Furthermore, in the fuel cell system according to the present embodiment, at least one of the permeability coefficient ratio α1 ($P_{CO2}/P_{H2}$) or the permeability coefficient ratio α2 ($P_{H2O}/P_{H2}$) is 30 or higher. Therefore, the influence of the effect of increasing the power generation efficiency of the system caused by at least one of carbon dioxide or water vapor permeating through the separation membrane becomes greater than the influence of the decrease of the power generation efficiency of the system of hydrogen permeating through the separation membrane, and the overall power generation efficiency of the system is excellent.

<3> The fuel cell system according to <1> or <2>, further comprising a reformer, in which the reformer includes a reforming unit for reforming the raw material gas and thereby producing the fuel gas; and a combustion unit for heating the reforming unit by a combustion reaction.

The fuel cell system according to the present embodiment further comprises a reformer that reforms a raw material gas and thereby producing a fuel gas, and the second fuel cell or the fuel cell performs power generation using a fuel gas produced by the reformer.

<4> The fuel cell system according to <3>, further comprising an exhaust channel for distributing an exhaust gas discharged from the combustion unit, in which the exhaust channel is disposed on the permeation side of the separation membrane instead of the distribution channel.

In the fuel cell system according to the present embodiment, an exhaust channel is disposed on the permeation side of the separation membrane instead of the distribution channel, and at least one of carbon dioxide or water vapor separated by the separation membrane circulates in the exhaust channel together with an exhaust gas circulating in the exhaust channel. Therefore, separation of at least one of carbon dioxide or water vapor can be promoted without separately providing a channel for supplying a sweep gas such as air to the permeation side of the separation membrane, and an air blower or a reduced pressure pump. Therefore, the overall power generation efficiency of the system can be increased while the production cost is reduced, and since the system is simplified, reliability of the system is enhanced.

<5> The fuel cell system according to <3> or <4>, further comprising a water vapor collecting means for collecting water vapor in the exhaust gas discharged from the combustion unit; and a water vapor supply channel for supplying the water vapor collected by the water vapor collecting means, to the reforming unit.

The fuel cell system according to the present embodiment comprises a water vapor collecting means for collecting water vapor included in the exhaust gas, for example, a condenser that collects water vapor by condensing the water vapor, and the water vapor collected by the water vapor collecting means is supplied to the reforming unit and is used for steam reforming of the raw material gas. Therefore, establishment of water independence, by which supplying of water vapor or reforming water from the outside becomes unnecessary, or reduction of the amount of supply of water vapor or reforming water from the outside, is enabled.

<6> The fuel cell system according to any one of <1> to <3>, further comprising a channel for distributing at least one of water vapor or carbon dioxide to be used at the time of producing the fuel gas by reforming the raw material gas, in which the channel is disposed on the permeation side of the separation membrane instead of the distribution channel.

In the fuel cell system according to the present embodiment, a channel for distributing at least one of water vapor or carbon dioxide is disposed on the permeation side of the separation membrane instead of the distribution channel, and at least one of carbon dioxide or water vapor separated by the separation membrane is used for reforming of the raw material gas together with the gas that circulates in the channel. Therefore, separation of at least one of carbon dioxide or water vapor can be promoted without separately providing a channel for supplying a sweep gas such as air to the permeation side of the separation membrane, and an air blower or a reduced pressure pump. Therefore, the overall power generation efficiency of the system can be increased while the production cost is reduced, and since the system is simplified, reliability of the system is enhanced.

<7> The fuel cell system according to any one of <1> to <6>, in which at least one of permeability coefficient ratio $\beta 1$ ($P_{CO2}/P_{CO}$) of the separation membrane or permeability coefficient ratio $\beta 2$ ($P_{H2O}/P_{CO}$) of the separation membrane is 6 or higher.

In the fuel cell system according to the present embodiment, at least one of the permeability coefficient ratio $\beta 1$ ($P_{CO2}/P_{CO}$) or the permeability coefficient ratio $\beta 2$ ($P_{H2O}/P_{CO}$) is 6 or higher. Therefore, the influence of the effect of increasing the power generation efficiency of the system caused by at least one of carbon dioxide or water vapor permeating through the separation membrane becomes greater than the influence of the decrease of the power generation efficiency of the system caused by carbon monoxide permeating through the separation membrane, and the overall power generation efficiency of the system is excellent.

<8> The fuel cell system according to any one of <1> to <7>, in which at least one of the permeability coefficient ratio $\alpha 1$ ($P_{CO2}/P_{H2}$) of the separation membrane or the permeability coefficient ratio $\alpha 2$ ($P_{H2O}/P_{H2}$) of the separation membrane is 60 or higher.

In the fuel cell system according to the present embodiment, the influence of the effect of increasing the power generation efficiency of the system caused by at least one of carbon dioxide or water vapor permeating through the separation membrane becomes greater than the influence of the decrease of the power generation efficiency of the system caused by hydrogen permeating through the separation membrane, and the overall power generation efficiency of the system is superior.

Advantageous Effects of Invention

According to the invention, a fuel cell system having excellent overall power generation efficiency of the system can be provided by adjusting the ratio between the permeability of at least one of carbon dioxide or water vapor and the permeability of hydrogen in the separation membrane to an appropriate range.

DESCRIPTION OF EMBODIMENTS

In the present specification, any numerical range indicated using an expression "from * to" represents a range in which numerical values described before and after the "* to" are included in the range as the lower limit value and the upper limit value thereof.

First Embodiment

Figure 1:
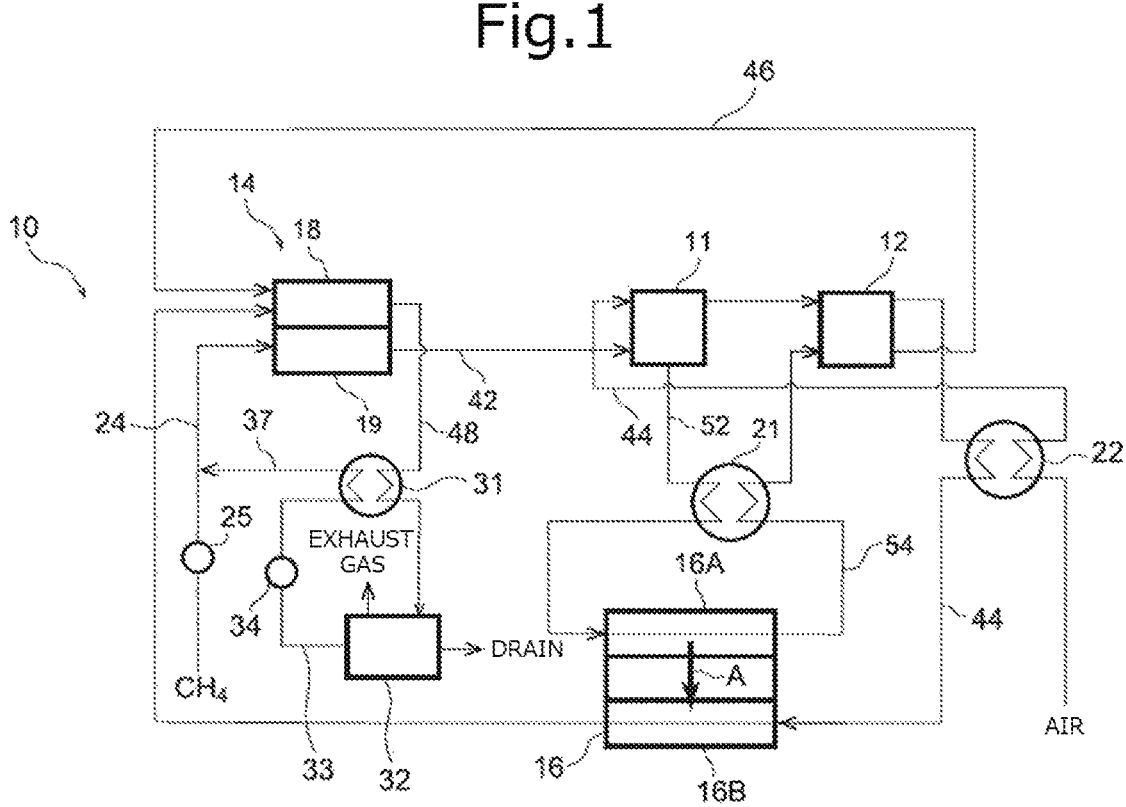
FIG. 1 is an outline configuration diagram illustrating a fuel cell system according to a first embodiment.

In the following description an embodiment of the fuel cell system of the invention will be explained using FIG. 1. FIG. 1 is an outline configuration diagram illustrating a fuel cell system according to a first embodiment. The fuel cell system 10 according to the first embodiment is a system comprising: a first fuel cell 11 for performing power generation using a fuel gas; a separation membrane 16 for separating at least one of carbon dioxide or water vapor from an anode off gas that is discharged from the first fuel cell 11 and includes unreacted fuel gas; a second fuel cell 12 disposed in the downstream of the separation membrane 16 for performing power generation using the anode off gas having at least one of carbon dioxide or water vapor separated therefrom; and an air supply channel 44 (distribution channel) disposed on the permeation side 16B of the separation membrane 16 for distributing a cathode off gas discharged from the second fuel cell 12. Furthermore, in the fuel cell system 10 according to the present embodiment, at least one of the permeability coefficient ratio $\alpha 1$ ($P_{CO2}/P_{H2}$) of the separation membrane 16 or the permeability coefficient ratio $\alpha 2$ ($P_{H2O}/P_{H2}$) of the separation membrane 16 is 30 or higher.

Furthermore, the fuel cell system 10 according to the present embodiment may comprise a reformer 14 including a reforming unit 19 that produces a fuel gas by reforming a raw material gas; and a combustion unit 18 that heats the reforming unit 19 by a combustion reaction.

The fuel cell system 10 according to the present embodiment is a multi-stage type fuel cell system comprising a first fuel cell 11 and a second fuel cell 12. In a circulation type fuel cell system, it is necessary to discharge some of the anode off gas discharged from the anode out of the circulation system in order to suppress an increase in the carbon dioxide concentration inside the circulation system; however, at that time, a portion of unreacted fuel gas is also discharged out of the circulation system. Therefore, there are limitations in increasing the fuel utilization rate. On the other hand, in a multi-stage type fuel cell system, the fuel gas included in the anode off gas discharged from the anode of the fuel cell of a previous stage (except for the fuel gas that has permeated through the separation membrane 16) is all supplied to the anode of the fuel cell of a subsequent stage. Therefore, a multi-stage type fuel cell system has an increased fuel utilization rate compared to a circulation type fuel cell system, and high power generation efficiency can be obtained.

Since at least one of carbon dioxide or water vapor separated by the separation membrane 16 circulates in the air supply channel 44 disposed on the permeation side 16B of the separation membrane 16, where a cathode off gas circulates, at least one of the carbon dioxide or water thus separated circulates in the air supply channel 44 together with the cathode off gas circulating in the air supply channel 44. Therefore, separation of at least one of carbon dioxide or water vapor can be promoted without separately providing a channel for supplying a sweep gas such as air to the permeation side 16B of the separation membrane 16, and an air blower or a reduced pressure pump. Therefore, in the fuel cell system 10, the overall power generation efficiency of the system can be increased while the production cost is reduced, and since the system is simplified, reliability of the system is enhanced.

Here, it is contemplated that by separating at least one of carbon dioxide or water vapor from an anode off gas discharged from the first fuel cell 11 and including unreacted fuel gas, using a separation membrane 16, the concentration of the fuel gas such as hydrogen or carbon monoxide is increased, and thereby the power generation efficiency of the system can be enhanced. However, in a conventional separation membrane, since hydrogen included in the anode off gas is separated together with at least one of carbon dioxide or water vapor, there is a risk that the power generation efficiency of the system may be decreased by reduction of hydrogen as a fuel gas.

Meanwhile, in the fuel cell system 10 according to the present embodiment, at least one of the permeability coefficient ratio α1 ($P_{CO2}/P_{H2}$) or the permeability coefficient ratio α2 ($P_{H2O}/P_{H2}$) is 30 or higher. Therefore, the influence of the effect of increasing the power generation efficiency of the system caused by at least one of carbon dioxide or water vapor permeating through the separation membrane 16 becomes greater than the influence of the decrease in the power generation efficiency of the system caused by hydrogen permeating through the separation membrane 16, and the overall power generation efficiency of the system is excellent.

In the following description, it will be explained that as an air supply channel 44 in which a cathode off gas circulates is provided on the permeation side 16B of the separation membrane 16 in the fuel cell system 10 according to the present embodiment, the power generation efficiency is excellent, and durability of the separation membrane is maintained suitably, compared to a case in which an air supply channel 44 that distributes air to be supplied to the cathode (cathode gas) of the first fuel cell 11 is provided on the permeation side 16B of the separation membrane 16.

In a configuration in which an air supply channel 44 that distributes air to be supplied to the cathode of the first fuel cell 11 is provided on the permeation side 16B of the separation membrane 16, at least one of carbon dioxide or water vapor is included in the gas to be supplied to the cathode of the first fuel cell 11, the oxygen partial pressure on the cathode side is decreased, and as a result, there is a risk that the electromotive force of the first fuel cell 11 may be lowered.

In a case in which at least one of carbon dioxide or water vapor is separated from an off gas discharged from the anode of the first fuel cell 11 by the separation membrane 16, hydrogen and carbon monoxide include in the anode off gas can also be separated in trace amounts. Since hydrogen and carbon monoxide are highly reactive with oxygen, as hydrogen and carbon monoxide separated into the permeation side 16B of the separation membrane 16 react with oxygen circulating on the permeation side 16B, local temperature increase of the separation membrane 16 is likely to occur, and there is a risk that durability of the separation membrane 16 may deteriorate. Therefore, in order to maintain the durability of the separation membrane 16 suitably, it is preferable to supply a gas having a lower proportion of oxygen to the permeation side 16B of the separation membrane 16.

In the fuel cell system 10 according to the present embodiment, since a cathode off gas having a lower proportion of oxygen than air is supplied to the permeation side 16B of the separation membrane 16, a reaction between oxygen and hydrogen or carbon monoxide that can permeate through the separation membrane 16 does not easily occur, and local temperature increase of the separation membrane 16 is suppressed. Thus, durability of the separation membrane 16 can be maintained suitably.

Furthermore, the concentrations of carbon dioxide and water vapor included in the cathode off gas discharged from the second fuel cell 12 of the fuel cell system 10 are lower compared to, for example, the exhaust gas discharged from the combustion unit 18. Therefore, in the fuel cell system 10, the large water vapor partial pressure difference and the large carbon dioxide partial pressure difference between the supply side 16A and the permeation side 16B in the separation membrane 16 become large, compared to a fuel cell system 40 according to a fourth embodiment that will be described below, in which an exhaust gas (a gas including carbon dioxide and water vapor) is supplied to the permeation side 16B of the separation membrane 16, and separation of water vapor and carbon dioxide is promoted. Therefore, the fuel cell system 10 has superior power generation efficiency.

In the following description, various configurations of the fuel cell system 10 according to the present embodiment will be explained.

(Raw Material Gas Supply Channel)

The fuel cell system 10 according to the present embodiment comprises a raw material gas supply channel 24 that supplies a raw material gas to a reformer 14, and the raw material gas supply channel 24 is provided with a blower 25 for distributing the raw material gas.

The raw material gas that circulates in the raw material gas supply channel 24 is not particularly limited as long as it is a gas that can be reformed, and an example may be a hydrocarbon fuel. Examples of the hydrocarbon fuel include natural gas, liquefied petroleum gas (LP gas), coal modified gas, and a lower hydrocarbon gas. Examples of the lower hydrocarbon gas include lower hydrocarbons having 4 or fewer carbon atoms, such as methane, ethane, ethylene, propane, or butane, and methane is particularly preferred. The hydrocarbon fuel may be a mixture of the above-mentioned lower hydrocarbon gases, or may be a gas obtained by mixing the above-mentioned lower hydrocarbon gases with a gas such as natural gas, town gas, or LP gas.

The raw material gas supply channel 24 is connected to a water vapor supply channel 37 that will be described below, and the water vapor circulating in the water vapor supply channel 37 is supplied to the raw material gas supply channel 24. Then, the water vapor supplied from the water vapor supply channel 37 is supplied to the reformer 14 together with the raw material gas. Meanwhile, from the viewpoint of preventing condensation of water vapor within the channel, the raw material gas supply channel 24 may be configured such that the raw material gas supply channel 24 is not connected to the water vapor supply channel 37, and water vapor is directly supplied to the reformer 14 through the water vapor supply channel 37.

(Reformer)

The fuel cell system 10 according to the present embodiment comprises a reformer 14 that produces a fuel gas by steam reforming a raw material gas. The reformer 14 is configured to include, for example, a combustion unit 18 where a burner or a combustion catalyst is disposed, and a reforming unit 19 including a reforming catalyst.

The reforming unit 19 is connected to a raw material gas supply channel 24 on the upstream side and is connected to a fuel gas supply channel 42 on the downstream side. Therefore, a raw material gas such as methane is supplied to the reforming unit 19 through the raw material gas supply channel 24, and after the raw material gas is steam reformed at the reforming unit 19, a fuel gas thus produced is supplied to the first fuel cell 11 through the fuel gas supply channel 42.

The combustion unit 18 is connected to an air supply channel 44 and an off gas channel 46 on the upstream side and is connected to an exhaust channel 48 on the downstream side. The combustion unit 18 burns a mixed gas of a gas including unreacted oxygen (cathode off gas), which is discharged from the cathode side of the second fuel cell 12 and is supplied through the air supply channel 44, and an anode off gas supplied through an off gas channel 46, and heats a reforming catalyst in the reforming unit 19. An exhaust gas from the combustion unit 18 circulates in the exhaust channel 48.

Since steam reforming occurring in the reforming unit 19 is associated with large heat absorption, supply of heat from the outside is needed for the progress of the reaction, and therefore, it is preferable to heat the reforming unit 19 by the combustion heat generated at the combustion unit 18. Alternatively, it is also acceptable to heat the reforming unit 19 using the heat dissipated from the respective fuel cells, without providing the combustion unit 18.

In a case in which a hydrocarbon gas represented by $C_nH_m$ (wherein n and m are both positive real numbers) as a raw material gas is subjected to steam reforming, carbon monoxide and hydrogen are produced at the reforming unit 19 by a reaction of the following Formula (a):

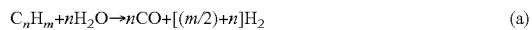

$$C_nH_m + nH_2O \rightarrow nCO + [(m/2)+n]H_2 \quad (a)$$

Furthermore, in a case in which methane as an example of the raw material gas is subjected to steam reforming, carbon monoxide and hydrogen are produced at the reforming unit 19 by a reaction of the following Formula (b):

$$CH_4 + H_2O \rightarrow CO + 3H_2 \quad (b)$$

The reforming catalyst installed in the reforming unit 19 is not particularly limited as long as it serves as a catalyst for a steam reforming reaction; and, a steam reforming catalyst containing at least one of Ni, Rh, Ru, Ir, Pd, Pt, Re, Co, Fe, or Mo as a catalytic metal is preferred.

The steam-carbon ratio S/C, which is the ratio between the number of molecules S of water vapor per unit time supplied to the reforming unit 19 of the reformer 14 and the number of carbon atoms C of the raw material gas per unit time supplied to the reforming unit 19 of the reformer 14, is preferably from 1.5 to 3.5, more preferably from 2.0 to 3.0, and even more preferably from 2.0 to 2.5. When the steam-carbon ratio S/C is in this range, the raw material gas is efficiently steam-reformed, and a fuel gas including hydrogen and carbon monoxide is produced. Furthermore, carbon precipitation inside the fuel cell system 10 can be suppressed, and thus reliability of the fuel cell system 10 can be increased.

It is preferable, from the viewpoint of efficiently performing steam reforming, that the combustion unit 18 heats the reforming unit 19 to from 600° C. to 800° C., and more preferably heats the reforming unit 19 to from 600° C. to 700° C.

In the fuel cell system (particularly, a fuel cell system including a high temperature type fuel cell) according to the invention, it is not necessary that the reformer is mounted in the outside of the first fuel cell, and the fuel cell system may be configured such that a raw material gas and water vapor are supplied directly to the first fuel cell, steam reforming (internal reforming) is performed inside the first fuel cell, and a fuel gas thus produced is used for the power generation at the first fuel cell. Particularly, in a case in which the first fuel cell is a high temperature type fuel cell, since the reaction temperature inside the fuel cell is a high temperature such as from 600° C. to 800° C., it is possible to perform steam reforming in the first fuel cell.

An exhaust gas circulating in the exhaust channel 48 perform heat exchange at a heat exchanger 31 that plays a role of vaporizer, with reforming water that circulates in a reforming water supply channel 33. Thereby, the exhaust gas circulating in the exhaust channel 48 is supplied to a water tank 32 (water vapor collecting means, for example, a condenser) after being cooled, and the reforming water circulating in the reforming water supply channel 33 is supplied to the raw material gas supply channel 24 through the water vapor supply channel 37 after being vaporized.

The water tank 32 is a container storing water that is obtained by condensing the water vapor included in the exhaust gas circulating in the exhaust channel 48. In the water tank 32, the exhaust gas except for water vapor is discharged outside, and when a predetermined amount or more of water is stored, for example, the water is drain-discharged by overflow.

The water tank 32 is connected to the reforming water supply channel 33, and the reforming water supply channel 33 is provided with a reforming water pump 34. The water stored in the water tank 32 is supplied as reforming water, by the reforming water pump 34, to the heat exchanger 31 through the reforming water supply channel 33.

The configuration of separating water vapor from the exhaust gas circulating in the exhaust channel 48 is not limited to the water tank 32, and for example, water vapor and gases other than water vapor may be separated using a separation membrane, or water vapor for steam reforming may be separated by adsorbing gases other than water vapor to an adsorbent.

Furthermore, instead of the heat exchanger 31 that performs heat exchange between the exhaust gas circulating in the exhaust channel 48 and the reforming water circulating in the reforming water supply channel 33, it is also acceptable to provide a vaporizer that vaporizes reforming water by utilizing the heat discharged from at least one of the reforming unit 19, the first fuel cell 11, or the second fuel cell 12.

The air supply channel 44 is a channel in which a gas including oxygen (cathode gas), such as air, and a gas including unreacted oxygen (cathode off gas) circulate, and the air supply channel 44 is provided with a heat exchanger 22. Thus, heat exchange is achieved between the cathode gas circulating in the air supply channel 44 on the upstream side of the first fuel cell 11, and the cathode off gas circulating in the air supply channel 44 on the downstream side of the second fuel cell 12. Thereby, the cathode off gas circulating in the air supply channel 44 on the downstream side of the second fuel cell 12 is cooled to a preferable temperature when at least one of carbon dioxide or water vapor is separated using a separation membrane 16, and the air circulating in the air supply channel 44 on the upstream side of the first fuel cell 11 is heated to a temperature appropriate for the operation temperature of the first fuel cell 11 and then is supplied to the cathode of the first fuel cell 11.

(First Fuel Cell)

The fuel cell system 10 according to the present embodiment comprises a first fuel cell 11 that performs power generation using a fuel gas supplied from a reformer 14 through a fuel gas supply channel 42. The first fuel cell 11 may be, for example, a fuel battery cell including an air electrode (cathode), an electrolyte, and a fuel electrode (anode), or may be a fuel cell stack obtained by stacking a plurality of fuel battery cells. Furthermore, examples of the first fuel cell include high temperature type fuel cells that operate at about from 600° C. to 800° C., for example, a solid oxide fuel cell that operates at about from 700° C. to 800° C., and a molten carbonate fuel cell that operates at about from 600° C. to 700° C.

In a case in which the first fuel cell 11 is a solid oxide fuel cell, air is supplied to the cathode (not illustrated in the diagram) of the first fuel cell 11 through the air supply channel 44. As air is supplied to the cathode, a reaction represented by the following Formula (c) occurs, and at that time, oxygen ions move around the interior of a solid oxide electrolyte (not illustrated in the diagram).

$$O_2 + 4e^- \rightarrow 2O^{2-} \tag{c}$$

In a case in which the first fuel cell 11 is a solid oxide fuel cell, a fuel gas including hydrogen and carbon monoxide is supplied to the anode (not illustrated in the diagram) of the first fuel cell 11 through the fuel gas supply channel 42. As hydrogen and carbon monoxide receive electrons from the oxygen ions moving inside a solid oxide electrolyte at the interface between the anode and the solid oxide electrolyte, reactions represented by the following Formula (d) and Formula (e) occur.

$$H_2 + O^{2-} \rightarrow H_2O + 2e^- \tag{d}$$

$$2CO + 2O^{2-} \rightarrow 2CO_2 + 4e^- \tag{e}$$

In a case in which the first fuel cell 11 is a molten carbonate fuel cell, a gas including oxygen and carbon dioxide is supplied to the cathode (not illustrated in the diagram) of the first fuel cell 11 through the air supply channel 44. As a gas including oxygen and carbon dioxide is supplied to the cathode, a reaction represented by the following Formula (f) occurs, and at that time, carbonate ions move around inside an electrolyte (not illustrated in the diagram).

$$O_2 + 2CO_2 + 4e^- \rightarrow 2CO_3^{2-} \tag{f}$$

In a case in which the first fuel cell 11 is a molten carbonate fuel cell, a fuel gas including hydrogen is supplied to the anode (not illustrated in the diagram) of the first fuel cell 11 through the fuel gas supply channel 42. As hydrogen receives electrons from the carbonate ions moving inside the electrolyte at the interface between the anode and the electrolyte, a reaction represented by the following Formula (g) occurs.

$$H_2 + CO_3^{2-} \rightarrow H_2O + CO_2 + 2e^- \tag{g}$$

In a case in which the first fuel cell 11 is a molten carbonate fuel cell, water vapor thus generated reacts with carbon monoxide supplied through the fuel gas supply channel 42, and a reaction represented by the following Formula (h) occurs. Thus, hydrogen and carbon dioxide are generated. Then, the hydrogen thus generated is consumed in the above-described reaction of Formula (g).

$$CO + H_2O \rightarrow H_2 + CO_2 \tag{h}$$

As shown in Formula (d), Formula (e), Formula (g), and Formula (h) described above, in a solid oxide fuel cell and a molten carbonate fuel cell, mainly water vapor and carbon dioxide are produced by an electrochemical reaction of the fuel gas at the first fuel cell 11. Furthermore, electrons produced at the anode move to the cathode through an external circuit. As electrons move from the anode to the cathode as such, power generation is achieved at the first fuel cell 11.

The cathode off gas discharged from the cathode is supplied to the cathode (not illustrated in the diagram) of the second fuel cell 12 through the air supply channel 44 on the downstream side.

Meanwhile, an anode off gas that is discharged from the anode and includes unreacted fuel gas is supplied to the supply side 16A of the separation membrane 16 through the off gas channel 52. Here, the anode off gas including unreacted fuel gas is a mixed gas including hydrogen, carbon monoxide, carbon dioxide, water vapor, and the like.

A heat exchanger 21 is provided in the off gas channel 52 and the off gas channel 54, and through this heat exchanger 21, heat exchange is achieved between the anode off gas circulating in the off gas channel 52 and the anode off gas circulating in the off gas channel 54 and having at least one of carbon dioxide or water vapor separated therefrom. Thereby, the anode off gas circulating in the off gas channel 52 is cooled to a preferable temperature at the time of separating at least one of carbon dioxide or water vapor using the separation membrane 16, and the anode off gas circulating in the off gas channel 54 and having at least one of carbon dioxide or water vapor separated therefrom, are heated to a temperature appropriate for the operation temperature of the second fuel cell 12. Therefore, the overall power generation efficiency and thermal efficiency of the system are further increased.

(Separation Membrane)

The fuel cell system 10 according to the present embodiment comprises a separation membrane 16 that separates at least one of carbon dioxide or water vapor from an anode off gas discharged from the first fuel cell 11 and including unreacted fuel gas. The separation membrane 16 is a membrane in which at least one of the permeability coefficient ratio α1 ($P_{CO2}/P_{H2}$) or the permeability coefficient ratio α2 ($P_{H2O}/P_{H2}$) satisfies 30 or higher.

The anode off gas circulating in the off gas channel 52 is supplied to the supply side 16A of the separation membrane 16, and at least one of carbon dioxide or water vapor in the anode off gas passes through the separation membrane 16 in the direction of arrow A from the supply side 16A to the permeation side 16B. The anode off gas after having at least one of carbon dioxide or water vapor circulates in the off gas channel 54 from the supply side 16A and is supplied to the second fuel cell 12. On the other hand, at least one of carbon dioxide or water vapor thus separated is mixed with the cathode off gas discharged from the second fuel cell 12 and flowing in the permeation side 16B, and the mixture circulates in the air supply channel 44 from the permeation side 16B and is supplied to the combustion unit 18 of the reformer 14. Therefore, the cathode off gas discharged from the second fuel cell 12 is utilized in a combustion reaction at the combustion unit 18, and it is not necessary to supply oxygen separately to the combustion unit 18.

Furthermore, an air supply channel 44 for distributing the cathode off gas is provided on the permeation side of the separation membrane 16, and thereby at least one of carbon dioxide or water vapor is caused to permeate to the permeation side of the separation membrane 16. Therefore, it is not necessary to separately provide a channel for supplying oxygen to the permeation side of the separation membrane 16, and an air blower or a reduced pressure pump, and the system is simplified.

Since at least one of carbon dioxide or water vapor that has permeated through the separation membrane 16 circulates in the air supply channel 44 together with the cathode off gas, the water vapor partial pressure and the carbon dioxide partial pressure on the permeation side 16B of the separation membrane 16 are lowered, and the water vapor partial pressure difference and the carbon dioxide partial pressure difference between the supply side 16A and the permeation side 16B can be made larger. Therefore, larger amounts of water vapor and carbon dioxide can be caused to move to the permeation side 16B, and separation of water vapor and carbon dioxide is promoted.

Therefore, in the fuel cell system 10, separation of at least one of carbon dioxide or water vapor is promoted along with simplification of the system. As a result, at least one of the water vapor concentration or the carbon dioxide concentration in the anode off gas supplied to the second fuel cell 12 can be made lower, and the power generation efficiency of the fuel cell system 10 can be further increased.

Furthermore, in the separation membrane 16, at least one of the permeability coefficient ratio α1 ($P_{CO2}/P_{H2}$) and the permeability coefficient ratio α2 ($P_{H2O}/P_{H2}$) is 30 or higher, the influence of the effect of increasing the power generation efficiency of the system caused by at least one of carbon dioxide or water vapor permeating through the separation membrane 16 becomes greater than the influence of the decrease of the power generation efficiency of the system caused by hydrogen permeating through the separation membrane 16, and the overall power generation efficiency of the system is excellent.

With regard to the separation membrane 16, from the viewpoint of having superior overall power generation efficiency of the system, it is preferable that at least one of the permeability coefficient ratio α1 ($P_{CO2}/P_{H2}$) or the permeability coefficient ratio α2 ($P_{H2O}/P_{H2}$) is 60 or higher, and it is more preferable that at least one of the permeability coefficient ratio α1 ($P_{CO2}/P_{H2}$) or the permeability coefficient ratio α2 ($P_{H2O}/P_{H2}$) is 120 or higher. The upper limits of the permeability coefficient ratio α1 ($P_{CO2}/P_{H2}$) and the permeability coefficient ratio α2 ($P_{H2O}/P_{H2}$) for the separation membrane 16 are not particularly limited, and the upper limits may be, for example, 100,000 or less, or may be 10,000 or less.

Furthermore, regarding the separation membrane 16, at least one of the permeability coefficient ratio β1 ($P_{CO2}/P_{CO}$) or the permeability coefficient ratio β2 ($P_{H2O}/P_{CO}$) may be 6 or higher, may be preferably 12 or higher, and may be more preferably 24 or higher. Thereby, the influence of the effect of increasing the power generation efficiency of the system caused by at least one of carbon dioxide or water vapor permeating through the separation membrane becomes greater than the influence of the decrease of the power generation efficiency of the system caused by carbon monoxide permeating through the separation membrane, and the overall power generation efficiency of the system is excellent. Meanwhile, the upper limits of the permeability coefficient ratio β1 ($P_{CO2}/P_{CO}$) and the permeability coefficient ratio β2 ($P_{H2O}/P_{CO}$) for the separation membrane 16 are not particularly limited, and the upper limits may be, for example, 100,000 or lower, and may be 10,000 or lower.

The unit of the permeability coefficient is barrer, and 1 barrer represents the following: 1 barrer=1×10$^{-10}$ cm$^3$ (standard state)·cm·cm$^{-2}$·s$^{-1}$·cmHg$^{-1}$. The permeability coefficient is a value measured according to the differential pressure method described in Part 1 of JIS K7126-1:2006 "Plastics—Film and sheeting—Determination of gas transmission rate".

The separation membrane is not particularly limited as long as it is a membrane that allows permeation of at least one of carbon dioxide or water vapor, in which at least one of the permeability coefficient ratio α1 ($P_{CO2}/P_{H2}$) or the permeability coefficient ratio α2 ($P_{H2O}/P_{H2}$) is 30 or higher, and examples include an organic polymer film, an inorganic material film, an organic polymer-inorganic material composite film, and a liquid film. It is preferable that the separation membrane is a glass-like polymer film, a rubber-like polymer film, an ion exchange resin film, an alumina film, a silica film, a carbon film, a zeolite film, a ceramic film, an aqueous amine solution film, or an ionic liquid film.

Examples of the separation membrane include organic polymer films such as a glass-like polymer film, a rubber-like polymer film, and an ion exchange resin film. Examples of the materials for the organic polymer films include various organic materials such as polyolefin-based resins such as polyethylene, polypropylene, polybutene, or polymethylpentene; fluororesins such as polytetrafluoroethylene, polyvinyl fluoride, or polyvinylidene fluoride; polystyrene, cellulose acetate, polyurethane, polyacrylonitrile, polysulfone, polyether sulfone, polyphenylene sulfide, polyimide, polyamide, polyetherimide, polypyrrole, polyphenylene oxide, polyaniline, polyvinyl alcohol, polyacrylic acid, or polyethylene glycol. The organic polymer film may be a film formed from one kind of organic material, or may be a film formed from two or more kinds of organic materials.

The separation membrane may also be, for example, an organic polymer film containing an organic polymer having water absorbency, such as polyvinyl alcohol, polyacrylic acid, a polyvinyl alcohol-polyacrylate copolymer, or polyethylene glycol; and a carbon dioxide carrier having affinity with carbon dioxide and exhibiting water solubility.

As the carbon dioxide carrier, an inorganic material and an organic material are used, and examples of the inorganic material include an alkali metal salt (preferably, an alkali metal carbonate), ammonia, and an ammonium salt, while examples of the organic material include an amine, an amine salt, a polyamine, and an amino acid. The carbon dioxide carrier may also be included in an inorganic material film, an organic polymer-inorganic material composite film, a liquid film, or the like.

Examples of the separation membrane include inorganic material films such as an alumina film, a silica film, a carbon film, a zeolite film, or a ceramic film, and as the inorganic material film, above all, a zeolite film is preferred. Examples of zeolite include A type, Y type, T type, ZSM-5 type, ZSM-35 type, and mordenite-based zeolite. The inorganic material film may be a film formed from one kind of inorganic material, or may be a film formed from two or more kinds of inorganic materials.

The separation membrane may be an organic polymer-inorganic material composite film. The organic polymer-inorganic material composite film is not particularly limited as long as it is a film formed from an organic material and an inorganic material; and, it is preferable that the composite film is, for example, a composite film formed from at least one kind of organic material selected from the above-mentioned organic materials and at least one kind of inorganic material selected from the above-mentioned inorganic materials.

Examples of the separation membrane include liquid films of an aqueous amine solution, and an ionic liquid. These liquid films may be products obtained by impregnating the above-mentioned organic polymer film, inorganic material film, or organic polymer-inorganic material composite film with an aqueous amine solution or an ionic liquid.

In a case in which an aqueous amine solution film is used as the separation membrane, when carbon dioxide in the anode off gas is chemically adsorbed to the aqueous amine solution film and then heated, carbon dioxide is separated, and carbon dioxide moves to the permeation side of the aqueous amine solution film. Regarding the aqueous amine solution, an aminoalcohol such as monoethanolamine may be mentioned.

In a case in which an ionic liquid film is used as the separation membrane, when carbon dioxide in the anode off gas adsorbs to the ionic liquid film, and adsorbed carbon dioxide is separated from the ionic liquid film, carbon dioxide moves to the permeation side of the ionic liquid film. Here, the ionic liquid is a salt having a melting point at a relatively low temperature of 150° C. or lower and is formed from, for example, a cation such as imidazolium ion or pyridinium ion, and an anion such as trifluoromethanesulfonic acid ion, tetrafluoroboric acid ion, or hexafluorophosphoric acid ion.

The thickness of the separation membrane is not particularly limited; and, from the viewpoint of mechanical strength, usually, the thickness is preferably in the range of from 10 μm to 3,000 μm, more preferably in the range of from 10 μm to 500 μm, and even more preferably in the range of from 15 μm to 150 μm.

The separation membrane may be supported by a porous support. Examples of the material for the support include paper, cellulose, polyester, polyolefin, polyamide, polyimide, polysulfone, polycarbonate, metal, glass, and ceramic. In a case in which a support is provided, from the viewpoint of suitably securing carbon dioxide permeability and water vapor permeability, the thickness of the separation membrane is preferably in the range of from 100 nm to 100 μm, and more preferably in the range of from 100 nm to 50 μm.

As a separation membrane for separating at least one of carbon dioxide or water vapor, for example, those films described in "Journal of Membrane Science Vol. 320 (2008) 390-400. The upper bound revisited" may also be used. Furthermore, as a separation membrane for separating at least one of carbon dioxide or water vapor, particularly as a separation membrane for separation carbon dioxide, the polymer films described in Japanese Patent No. 5329207, the accelerated $CO_2$ transport membrane described in Japanese Patent No. 4965928, the separation membrane described in Japanese Patent No. 5743639, the permeable membrane described in Japanese Patent No. 5738704, and the like may also be used.

The anode off gas after having at least one of carbon dioxide or water vapor separated therefrom circulates in the off gas channel 54 from the supply side 16A and is supplied to the second fuel cell 12. At this time, as described above, the anode off gas circulating in the off gas channel 54 and having at least one of carbon dioxide or water vapor separated therefrom is heated to a temperature appropriate for the operation temperature of the second fuel cell 12 by a heat exchanger 21 provided in the off gas channel 52 and the off gas channel 54.

(Second Fuel Cell)

The fuel cell system 10 according to the present embodiment comprises a second fuel cell 12 that is disposed in the downstream of the separation membrane 16 and performs power generation using an anode off gas having at least one of carbon dioxide or water vapor separated therefrom. The second fuel cell 12 may be, for example, a fuel battery cell including an air electrode (cathode), an electrolyte, and a fuel electrode (anode), or may be a fuel cell stack obtained by laminating a plurality of fuel battery cells. Meanwhile, since the second fuel cell 12 has a configuration similar to that of the first fuel cell 11 described above, description on common matters will not be repeated herein.

In the fuel cell system 10, the second fuel cell 12 performs power generation using an anode off gas having at least one of carbon dioxide or water vapor separated therefrom. Therefore, in the second fuel cell 12, the theoretical voltage attributed to the difference in the oxygen partial pressure between electrodes is increased, while at the same time, the concentration overvoltage attributed to at least one of carbon dioxide or water vapor in the anode off gas is reduced. Thus, the second fuel cell 12 can exhibit superior performance particularly at a high current density. Therefore, high power generation efficiency can be obtained with the fuel cell system 10, compared to a multi-stage type fuel cell system in which power generation is carried out at a fuel cell in the latter stage using an anode off gas from which water vapor has not been separated.

The cathode off gas discharged from the cathode of the second fuel cell 12 is supplied to the combustion unit 18 of the reformer 14 through the air supply channel 44 on the downstream side, together with water vapor and carbon dioxide separated by the separation membrane 16. Meanwhile, the anode off gas discharged from the anode of the second fuel cell 12 is supplied to the combustion unit 18 of the reformer 14 through the off gas channel 46.

Modification Example

In the present embodiment, since the air supply channel 44 is arranged in series, after air is supplied to the first fuel cell 11, the cathode off gas discharged from the first fuel cell 11 is supplied to the second fuel cell 12; however, the air supply channel 44 may be arranged in parallel. That is, a configuration in which the air supply channel 44 in which air circulates is branched, and air is supplied respectively to the cathodes of the first fuel cell 11 and the second fuel cell 12, may also be used. At this time, a configuration in which at least one of the cathode off gas discharged from the cathode of the first fuel cell 11 or the cathode off gas discharged from the cathode of the second fuel cell 12 is supplied to the permeation side 16B of the separation membrane 16, is desirable.

In the present embodiment, a fuel cell system comprising two fuel cells (first fuel cell 11 and a second fuel cell 12) has been explained; however, the present invention is not limited to this, and a fuel cell system comprising three or more fuel cells is also acceptable, or for example, a configuration including a third fuel cell in the downstream of the second fuel cell 12 is also acceptable. At this time, a configuration in which the cathode off gas discharged from the cathode of the third fuel cell is supplied to the combustion unit of the reformer through the air supply channel on the downstream side together with the water vapor and carbon dioxide separated by the separation membrane, and the anode off gas discharged from the anode of the third fuel cell is supplied to the combustion unit of the reformer through the off gas channel, is also acceptable.

In the present embodiment, a configuration of providing one separation membrane for separating at least one of carbon dioxide or water vapor has been explained; however, the invention is not limited to this, and a configuration of disposing a plurality of separation membranes may also be adopted. For example, a carbon dioxide separation membrane for separating carbon dioxide and a water vapor separation membrane for separating water vapor may be separately disposed as separation membranes. At this time, it is desirable for the carbon dioxide separation membrane that the permeability coefficient ratio $\alpha 1$ ($P_{CO2}/P_{H2}$) satisfies the above-described range, and it is desirable for the water vapor separation membrane that the permeability coefficient ratio $\alpha 2$ ($P_{H2O}/P_{H2}$) satisfies the above-described range. It is not necessary to strictly distinguish the carbon dioxide separation membrane and the water vapor separation membrane, and the carbon dioxide separation membrane may be a separation membrane that allows permeation of water vapor together with carbon dioxide, or the water vapor separation membrane may be a separation membrane that allows permeation of carbon dioxide together with water vapor. Furthermore, the material of the water vapor separation membrane and the carbon dioxide separation membrane may be similar to the material of the separation membrane described above. Regarding the carbon dioxide separation membrane, an accelerated $CO_2$ transport membrane may be used.

In the present embodiment, in a case in which a water vapor separation membrane that separates water vapor is disposed as the separation membrane 16, the fuel cell system 10 may further comprise a carbon dioxide removal unit that removes carbon dioxide from the anode off gas, in the downstream of the first fuel cell 11 and in the upstream of the second fuel cell 12. Thereby, in the present embodiment, since the second fuel cell 12 performs power generation using an anode off gas having water vapor and carbon dioxide separated therefrom, the power generation efficiency can be further increased.

The carbon dioxide removal unit is intended to remove carbon dioxide from the anode off gas, and for example, a carbon dioxide removal unit including a filter that adsorbs or absorbs carbon dioxide, a carbon dioxide absorbent that absorbs carbon dioxide, or a carbon dioxide removing material that removes carbon dioxide may be used. In addition to that, a carbon dioxide removal unit that removes carbon dioxide from the anode off gas by an electrochemical reaction is also acceptable. In a case in which the carbon dioxide removal unit removes carbon dioxide from the anode off gas by an electrochemical reaction, since water (water vapor) is needed for the reaction at the anode, it is preferable to dispose the carbon dioxide removal unit on the upstream side of the separation membrane 16. Thereby, the water required at the time of performing an electrochemical reaction can be sufficiently supplied, and carbon dioxide can be removed suitably.

In the present embodiment, in a case in which a carbon dioxide separation membrane that separates carbon dioxide is disposed as the separation membrane 16, the fuel cell system 10 may further comprise a water vapor removal unit that removes water vapor from the anode off gas, in the downstream of the first fuel cell 11 and in the upstream of the second fuel cell 12. Thereby, in the present embodiment, since the second fuel cell 12 performs power generation using an anode off gas having water vapor and carbon dioxide separated therefrom, the power generation efficiency can be further increased.

The water vapor removal unit is intended to remove water vapor from the anode off gas, and may be a separation membrane that separates water vapor, an adsorbent that adsorbs water vapor, a condenser that condenses water vapor, or the like. In a case in which a condenser that condenses water vapor is disposed as the water vapor removal unit, the condenser may also be used for steam reforming of the raw material gas by supplying condensed water obtained by condensing water vapor to the water tank 32.

Second Embodiment

Figure 2:
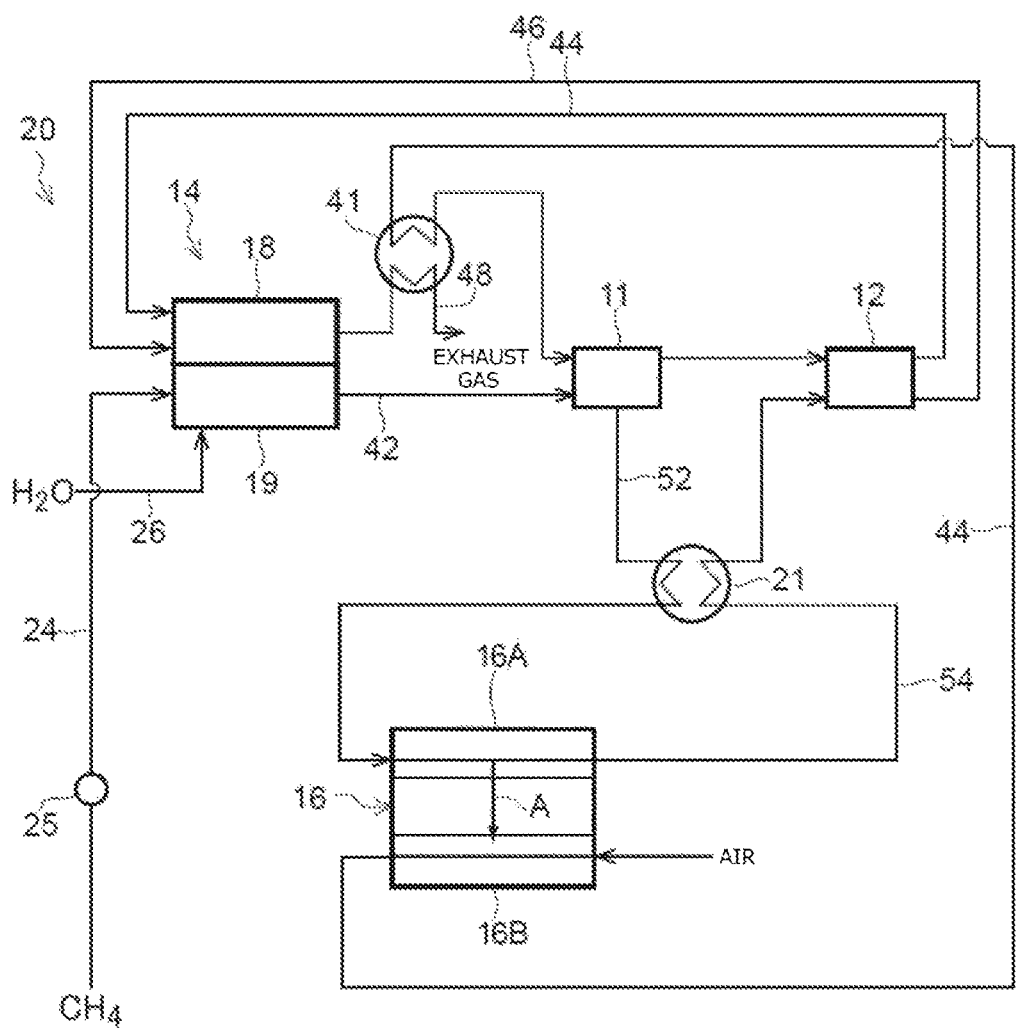
FIG. 2 is an outline configuration diagram illustrating a fuel cell system according to a second embodiment.

In the following description, a second embodiment of the fuel cell system of the invention will be explained using FIG. 2. FIG. 2 is an outline configuration diagram illustrating a fuel cell system according to the second embodiment. The fuel cell system 20 according to the second embodiment is different from the fuel cell system 10 according to the first embodiment, from the viewpoint that an air supply channel (distribution channel) 44 distributing air (cathode gas) that is used for the power generation of the first fuel cell 11 is disposed on the permeation side 16B of the separation membrane 16; from the viewpoint that a water vapor supply channel 26 that supplies water vapor to the reforming unit 19 of the reformer 14 is disposed instead of a water tank 32, a water vapor supply channel 37, or the like; and from the viewpoint that a heat exchanger 41 that performs heat exchange between an exhaust gas circulating in the exhaust channel 48, and a mixed gas of air circulating in the air supply channel 44 and to be used for the power generation of the first fuel cell 11 and at least one of carbon dioxide or water vapor separated by the separation membrane 16, is disposed instead of the heat exchanger 22. In the present embodiment and the following third embodiment to tenth embodiment, the same reference numerals will be assigned to configurations similar to those of the first embodiment, and further explanations will not be repeated.

Also in the fuel cell system 20 according to the present embodiment, at least one of carbon dioxide or water vapor separated by the separation membrane 16 circulates in the air supply channel 44 that distributes air that is used for the power generation of the first fuel cell 11 disposed on the permeation side 16B of the separation membrane 16, at least one of carbon dioxide or water vapor thus separated circulates in the air supply channel 44 together with air that circulates in the air supply channel 44. Therefore, separation of at least one of carbon dioxide or water vapor can be promoted without separately providing a channel for supplying a sweep gas such as air to the permeation side 16B of the separation membrane 16, and an air blower or a reduced pressure pump. Therefore, in the fuel cell system 20, the overall power generation efficiency of the system can be increased while the production cost is reduced, and since the system is simplified, reliability of the system is enhanced.

In the fuel cell system 20, unlike the first embodiment, a heat exchanger 41 is provided in the air supply channel 44 on the downstream side from the permeation side 16B of the separation membrane 16 and the exhaust channel 48, and though the heat exchanger 41, heat exchange is achieved between the exhaust gas circulating in the exhaust channel 48, and a mixed gas of air circulating the air supply channel 44 and at least one of carbon dioxide or water vapor separated by the separation membrane 16 (hereinafter, also referred to as "mixed gas"). Thereby, the exhaust gas circulating in the exhaust channel 48 is discharged out of the system after being cooled, while the mixed gas circulating in the air supply channel 44 is heated to a temperature appropriate for the operation temperature of the first fuel cell 11.

At the cathode of the first fuel cell 11, the mixed gas is supplied through the air supply channel 44, and power generation is achieved. Next, the cathode off gas discharged from the cathode of the first fuel cell 11 is supplied to the cathode of the second fuel cell 12 through the air supply channel 44 on the downstream side, and power generation is achieved.

The cathode off gas discharged from the cathode of the second fuel cell 12 is supplied to the combustion unit 18 of the reformer 14 through the air supply channel 44 on the downstream side. Meanwhile, the anode off gas discharged from the anode of the second fuel cell 12 is supplied to the combustion unit 18 of the reformer 14 through the off gas channel 46.

An exhaust gas generated by combusting, at the combustion unit 18, a mixed gas of the cathode off gas supplied through the air supply channel 44 and the anode off gas supplied through the off gas channel 46 is discharged to the exhaust channel 48. As described above, heat exchange is carried out between the exhaust gas circulating in the exhaust channel 48 and the mixed gas circulating in the air supply channel 44, at the heat exchanger 41.

In the present embodiment, the water vapor supply channel 26 that supplies water vapor to the reforming unit 19 of the reformer 14 is disposed; however, from the viewpoint of establishing water independence, by which the supply of reforming water or water vapor from the outside becomes unnecessary, or from the viewpoint of reducing the amount of supply of reforming water or water vapor from the outside, the water vapor included in the exhaust gas circulating in the exhaust channel 48 may be condensed and collected and may be utilized as reforming water, similarly to the first embodiment.

Furthermore, according to the present embodiment, it is also acceptable that a carbon dioxide supply channel that supplies carbon dioxide to the reforming unit 19 of the reformer 14 may be disposed instead of the water vapor supply channel 26, and carbon dioxide reforming may be carried out at the reforming unit 19.

Third Embodiment

Figure 3:
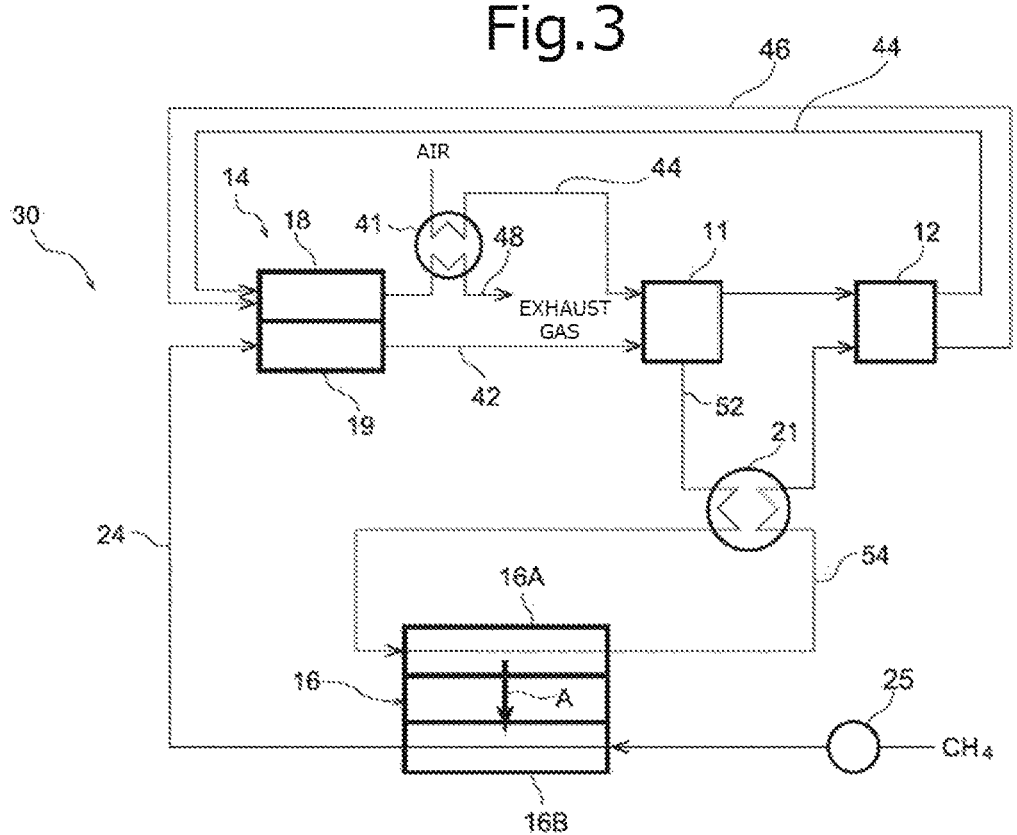
FIG. 3 is an outline configuration diagram illustrating a fuel cell system according to a third embodiment.

In the following description, a third embodiment of the fuel cell system of the invention will be explained using FIG. 3. FIG. 3 is an outline configuration diagram illustrating a fuel cell system according to the third embodiment. The fuel cell system 30 according to the third embodiment is different from the second embodiment from the viewpoint that a raw material gas supply channel 24 distributing a raw material gas that serves as a fuel gas to be used for power generation of the first fuel cell 11 is disposed on the permeation side 16B of the separation membrane 16, and from the viewpoint that at least one of carbon dioxide or water vapor that has permeated through the separation membrane 16 is supplied to the reforming unit 19 through the raw material gas supply channel 24, without disposing the water vapor supply channel 26.

In the fuel cell system 30 according to the present embodiment as well, at least one of carbon dioxide or water vapor separated by the separation membrane 16 is supplied to the raw material gas supply channel 24 disposed on the permeation side 16B of the separation membrane 16. Since the raw material gas circulates in the raw material gas supply channel 24, at least one of water vapor or carbon dioxide thus separated is supplied to the reforming unit 19 together with the raw material gas. Therefore, separation of at least one of water vapor or carbon dioxide can be promoted, without separately providing a channel for supplying a sweep gas such as air to the permeation side 16B of the separation membrane 16, and an air blower or a reduced pressure pump. Furthermore, it is not necessary to separately provide a supply channel and a blower in order to supply at least one of water vapor or carbon dioxide thus separated to the reforming unit 19, and since the system is simplified, reliability of the system is enhanced.

In the present embodiment, at least one of water vapor or carbon dioxide separated by the separation membrane 16 is supplied to the reforming unit 19 of the reformer 14 and is used for reforming of the raw material gas. Therefore, the present embodiment is not limited to a configuration of steam reforming the raw material gas, and may have a configuration of subjecting the raw material gas to carbon dioxide reforming, or may have a configuration of subjecting the raw material gas to steam reforming and carbon dioxide reforming.

Fourth Embodiment

Figure 4:
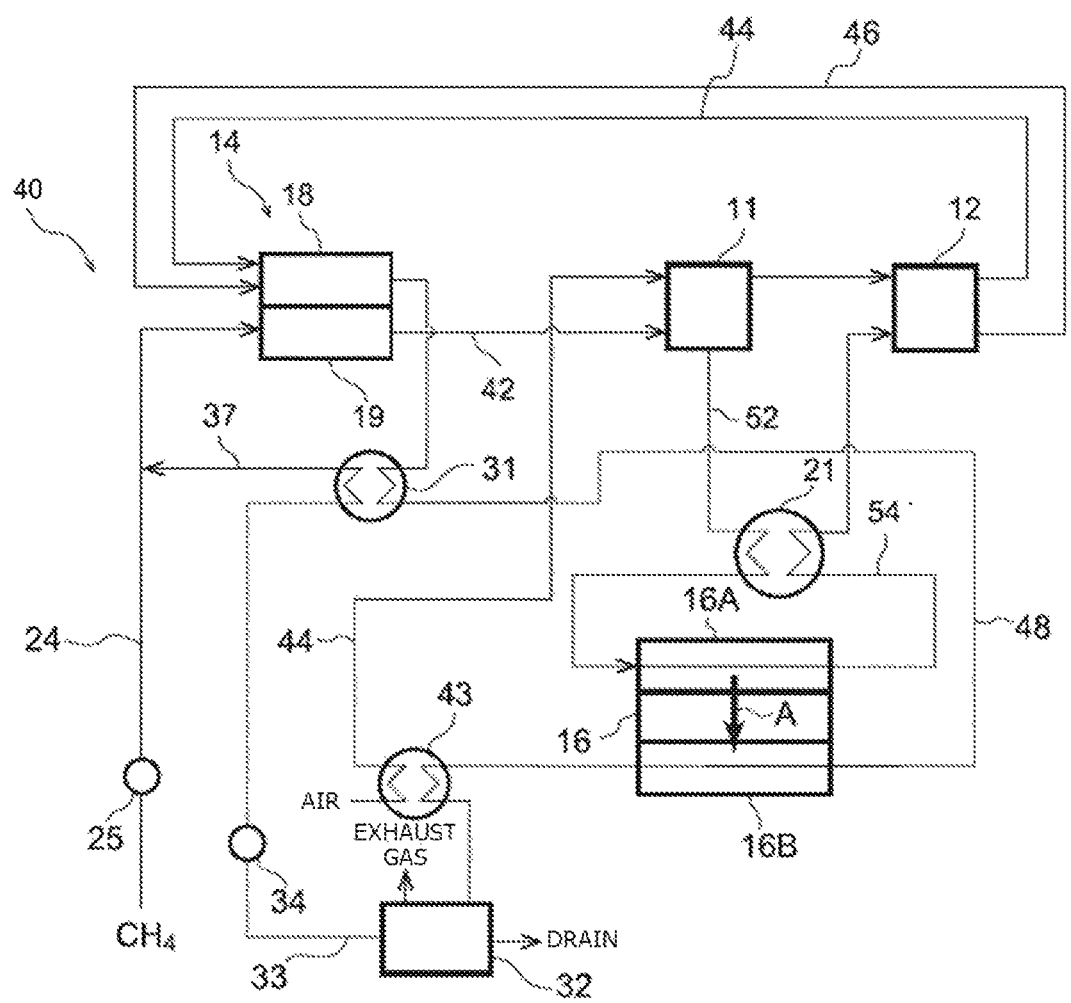
FIG. 4 is an outline configuration diagram illustrating a fuel cell system according to a fourth embodiment.

In the following description, a fourth embodiment of the fuel cell system of the invention will be explained using FIG. 4. FIG. 4 is an outline configuration diagram illustrating the fuel cell system according to the fourth embodiment. The fuel cell system 40 according to the fourth embodiment is different from the first embodiment from the viewpoint that an exhaust channel 48 that distributes an exhaust gas discharged from the combustion unit is disposed on the permeation side 16B of the separation membrane 16, and from the viewpoint that a heat exchanger 43 that performs heat exchange between an exhaust gas circulating in the exhaust channel 48 and mixed with at least one of carbon dioxide or water vapor, which has permeated through the separation membrane 16, and air circulating in the air supply channel 44 and to be used for the power generation of the first fuel cell 11, is disposed instead of the heat exchanger 22.

In the fuel cell system 40, at least one of water vapor or carbon dioxide, which has been separated by the separation membrane 16, is supplied to the exhaust channel 48 disposed on the permeation side of the separation membrane 16. Since an exhaust gas discharged from the combustion unit 18 circulates in the exhaust channel 48, at least one of water vapor or carbon dioxide thus separated circulates in the exhaust channel 48 together with this exhaust gas. Therefore, by providing the exhaust channel 48 on the permeation side 16B of the separation membrane 16, it is not necessary to separately provide a channel for supplying a sweep gas such as air on the permeation side 16B of the separation membrane 16, and an air blower or a reduced pressure pump, the production cost is reduced, and the overall power generation efficiency of the system can be increased. Furthermore, since the system is simplified, reliability of the system is enhanced.

Since at least one of water vapor or carbon dioxide, which has permeated through the separation membrane 16, circulates in the exhaust channel 48 together with the exhaust gas, the water vapor partial pressure and the carbon dioxide partial pressure on the permeation side 16B of the separation membrane 16 are lowered, and separation of at least one of water vapor or carbon dioxide is promoted. Therefore, in the fuel cell system 40, separation of water vapor or carbon dioxide is promoted along with simplification of the system.

Similarly to the fuel cell system 10 according to the first embodiment, the fuel cell system 40 according to the present embodiment has excellent power generation efficiency compared to a case in which an air supply channel 44 distributing air (cathode gas) that is used for the power generation of the first fuel cell 11, is provided on the permeation side 16B of the separation membrane 16.

In the fuel cell system 40 according to the present embodiment, since an exhaust gas discharged from the combustion unit 18 having a lower oxygen proportion than air is supplied to the permeation side 16B of the separation membrane 16, a reaction between oxygen and hydrogen or carbon monoxide, which can permeate through the separation membrane 16, does not easily occur, and local temperature increase of the separation membrane 16 is suppressed. Thus, durability of the separation membrane 16 can be suitably maintained.

In the fuel cell system 40, unlike the first embodiment, a heat exchanger 43 is provided in the exhaust channel 48 and the air supply channel 44, and through the heat exchanger 43, heat exchange is achieved between the exhaust gas circulating in the exhaust channel 48 and the air circulating in the air supply channel 44. Thereby, the exhaust gas circulating in the exhaust channel 48 is supplied to a water tank 32 (condenser) after being cooled, and the air circulating in the air supply channel 44 is supplied to the cathode of the first fuel cell 11 after being heated to a temperature appropriate for the operation temperature of the first fuel cell 11.

Air is supplied to the cathode of the first fuel cell 11 through the air supply channel 44, and power generation is carried out at the first fuel cell 11. Next, the cathode off gas discharged from the cathode of the first fuel cell 11 is supplied to the cathode of the second fuel cell 12 through the air supply channel 44 on the downstream side, and power generation is carried out at the second fuel cell 12.

The cathode off gas discharged from the cathode of the second fuel cell 12 is supplied to the combustion unit 18 of the reformer 14 through the air supply channel 44 on the downstream side. Meanwhile, the anode off gas discharged from the anode of the second fuel cell 12 is supplied to the combustion unit 18 of the reformer 14 through the off gas channel 46. An exhaust gas generated by combusting a mixed gas of the anode off gas and the cathode off gas supplied to the combustion unit 18 is discharged to the exhaust channel 48.

The exhaust gas circulating in the exhaust channel 48 performs heat exchange with reforming water at the heat exchanger 31 that vaporizes the reforming water circulating in the reforming water supply channel 33. Thereby, the exhaust gas circulating in the exhaust channel 48 on the downstream side of the heat exchanger 31 is cooled to a preferable temperature at the time of separating at least one of water vapor or carbon dioxide using the separation membrane 16, and then is supplied to the permeation side 16B of the separation membrane 16. The reforming water circulating in the reforming water supply channel 33 is supplied, after being vaporized, to the raw material gas supply channel 24 through the water vapor supply channel 37.

Fifth Embodiment

Figure 5:
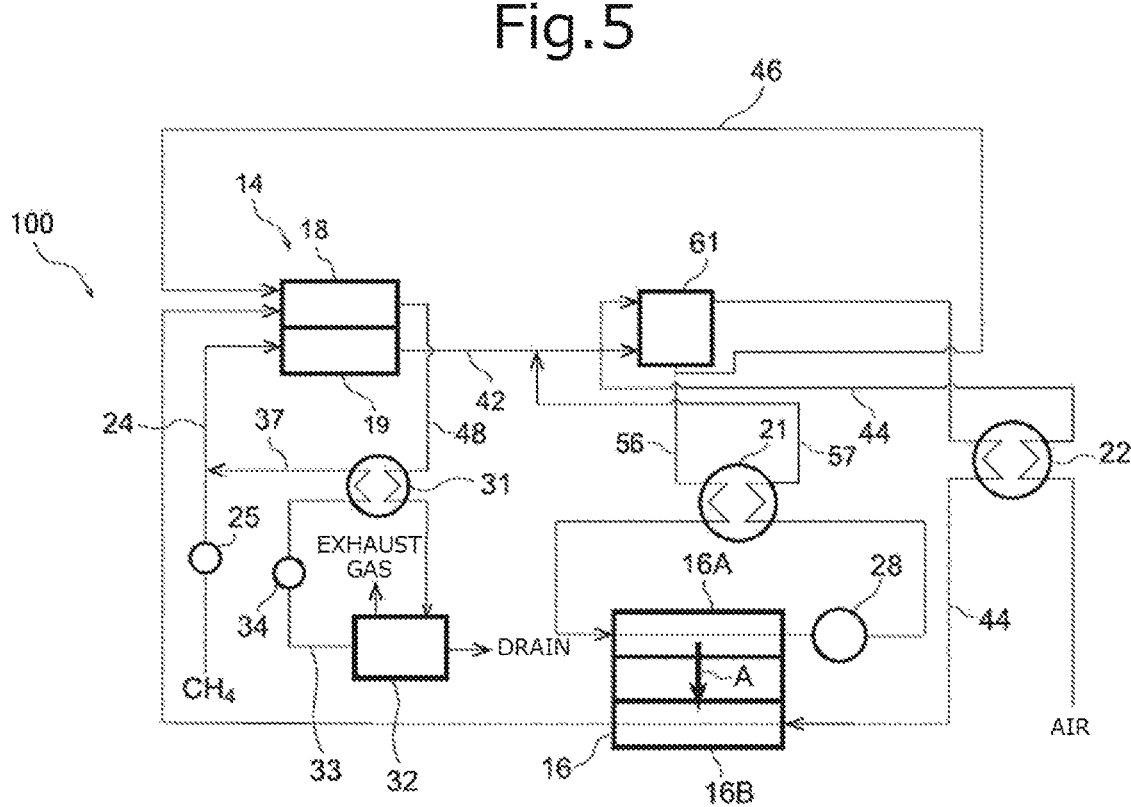
FIG. 5 is an outline configuration diagram illustrating a fuel cell system according to a fifth embodiment.

The first embodiment to the fourth embodiment described above are multi-stage type fuel cell systems; however, the present invention is not limited to this and may be a circulation type fuel cell system. In the following description, a circulation type fuel cell system 100 according to an embodiment of the invention will be explained using FIG. 5. FIG. 5 is an outline configuration diagram illustrating a fuel cell system according to a fifth embodiment.

As illustrated in FIG. 5, the fuel cell system 100 according to the fifth embodiment is a circulation type fuel cell system comprising off gas circulation channels 56 and 57 that supply the anode off gas having at least one of water vapor or carbon dioxide separated therefrom, to the fuel cell 61 again. Since the fuel cell 61 has a configuration similar to that of the first fuel cell 11 described above, further explanation thereof will not be repeated here, and for configurations similar to those of the first embodiment, explanation thereof will not be repeated here.

In the fuel cell system 100, with regard to the anode off gas discharged from the fuel cell 61 and including unreacted fuel gas, a portion thereof circulates in the off gas channel 46 and is supplied to the combustion unit 18, while the remaining portion circulates in the off gas circulation channel 56 and is supplied to the supply side 16A of the separation membrane 16. The separation membrane 16 separates at least one of water vapor or carbon dioxide from the anode off gas thus supplied, and the anode off gas having at least one of water vapor or carbon dioxide separated therefrom circulates in the off gas circulation channel 57. The anode off gas circulating in the off gas circulation channel 57 is supplied to the fuel gas supply channel 42 and is mixed with the fuel gas circulating in the fuel gas supply channel 42, and then the mixed gas is supplied to the anode of the fuel cell 61. Thus, power generation is achieved. In the fuel cell system 100, power generation efficiency that is higher than the power generation efficiency of the circulation type fuel cell system that does not separate at least one of water vapor or carbon dioxide and reutilizes the anode off gas, can be obtained. Meanwhile, the anode off gas circulating in the off gas circulation channel 57 may be configured to be supplied to the reforming unit 19, instead of being configured to be supplied to the fuel gas supply channel 42 (the same applies to the following sixth, seventh, eighth, and tenth embodiments).

In the off gas circulation channel 57, a recycle blower 28 for circulating the anode off gas is disposed. The disposition of the recycle blower is not particularly limited, and the recycle blower may be disposed in the upstream of the separation membrane 16 or may be disposed in the downstream of the separation membrane 16. In a case in which the recycle blower is provided in the upstream of the separation membrane 16, it is preferable that the recycle blower is disposed between the heat exchanger 21 and the separation membrane 16, and in a case in which the recycle blower is provided in the downstream of the separation membrane 16, it is preferable that the recycle blower is disposed between the separation membrane 16 and the heat exchanger 21.

At least one of water vapor or carbon dioxide separated by the separation membrane 16 is supplied to the air supply channel 44 disposed on the permeation side 16B of the separation membrane 16. Since the cathode off gas discharged from the fuel cell 61 circulates in the air supply channel 44, at least one of water vapor or carbon dioxide thus separated circulates in the air supply channel 44 together with the cathode off gas. Therefore, by providing the air supply channel 44 on the permeation side 16B of the separation membrane 16, it is not necessary to separately provide a channel for supplying a sweep gas such as oxygen on the permeation side 16B of the separation membrane 16, and an air blower or a reduced pressure pump, the production cost is reduced, and the overall power generation efficiency of the system can be increased. Furthermore, since the system is simplified, reliability of the system is enhanced.

Sixth Embodiment

Figure 6:
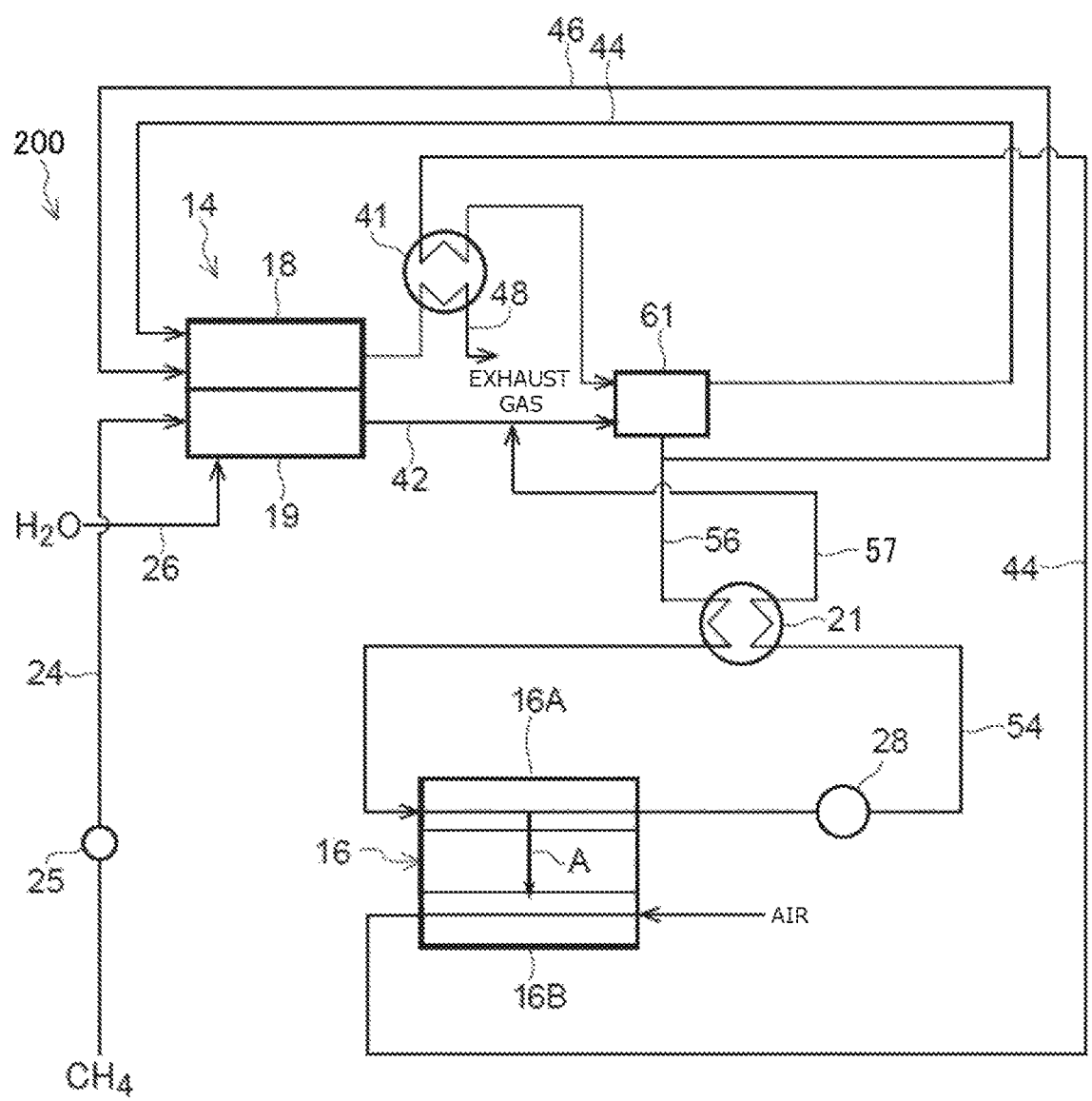
FIG. 6 is an outline configuration diagram illustrating a fuel cell system according to a sixth embodiment.

In the following description, a sixth embodiment of the fuel cell system of the invention will be explained using FIG. 6. FIG. 6 is an outline configuration diagram illustrating a fuel cell system according to the sixth embodiment. The fuel cell system 200 according to the sixth embodiment is different from the fuel cell system 20 according to the second embodiment, from the viewpoint that the fuel cell system 200 is a circulation type fuel cell system including a fuel cell 61.

In the fuel cell system 200 according to the present embodiment as well, similarly to the second embodiment, at least one of carbon dioxide or water vapor, which has been separated by the separation membrane 16, circulates in the air supply channel 44 together with the air circulating in the air supply channel 44. Therefore, separation of at least one of carbon dioxide or water vapor can be promoted without separately providing a channel for supplying a sweep gas such as air to the permeation side 16B of the separation membrane 16, and an air blower or a reduced pressure. Therefore, in the fuel cell system 200, the overall power generation efficiency of the system can be increased while the production cost is reduced, and since the system is simplified, reliability of the system is enhanced.

Seventh Embodiment

Figure 7:
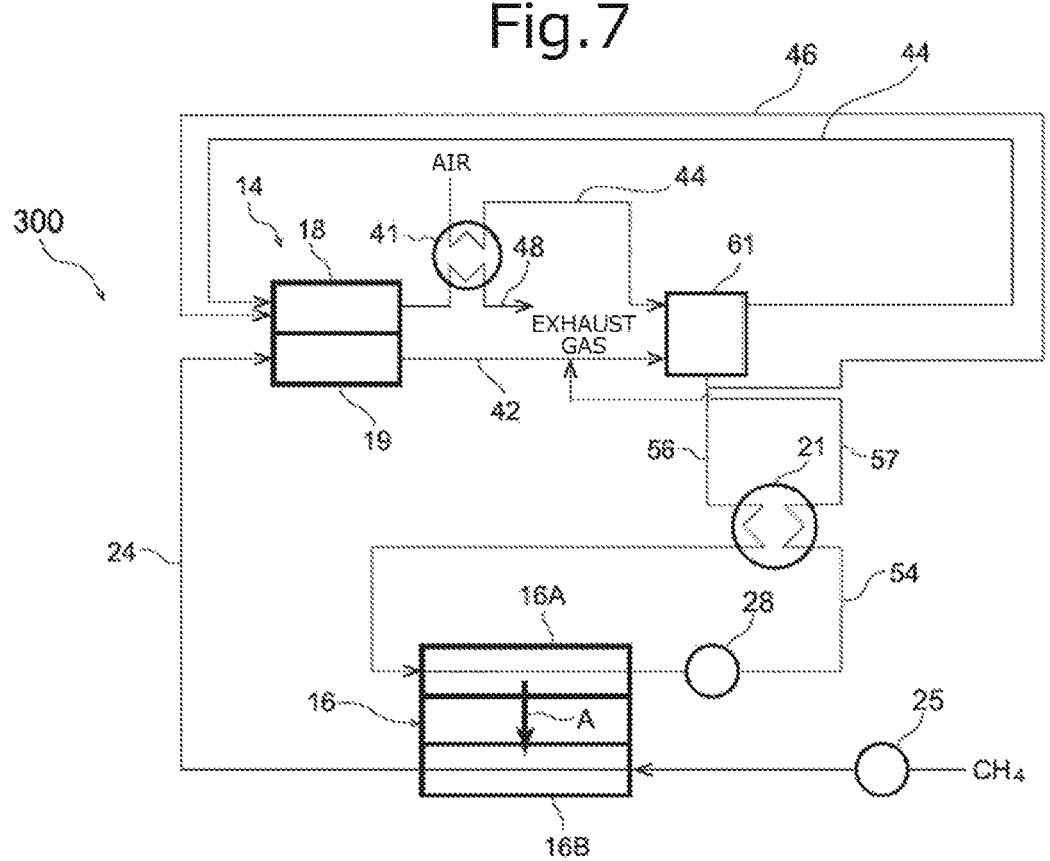
FIG. 7 is an outline configuration diagram illustrating a fuel cell system according to a seventh embodiment.

In the following description, a seventh embodiment of the fuel cell system of the invention will be explained using FIG. 7. FIG. 7 is an outline configuration diagram illustrating a fuel cell system according to the seventh embodiment. The fuel cell system 300 according to the seventh embodiment is different from the fuel cell system 30 according to the third embodiment, from the viewpoint that the fuel cell system 300 is a circulation type fuel cell system including a fuel cell 61.

In regard to the fuel cell system 300 according to the present embodiment as well, similarly to the third embodiment, at least one of carbon dioxide or water vapor, which has been separated by the separation membrane 16, is supplied to the reforming unit 19 together with a raw material gas. Therefore, separation of at least one of water vapor or carbon dioxide can be promoted without separately providing a channel for supplying a sweep gas such as air to the permeation side 16B of the separation membrane 16, and an air blower or a reduced pressure pump. Furthermore, it is not necessary to separately provide a supply channel and a blower for supplying at least one of water vapor or carbon dioxide thus separated to the reforming unit 19, and since the system is simplified, reliability of the system is enhanced.

Eighth Embodiment

Figure 8:
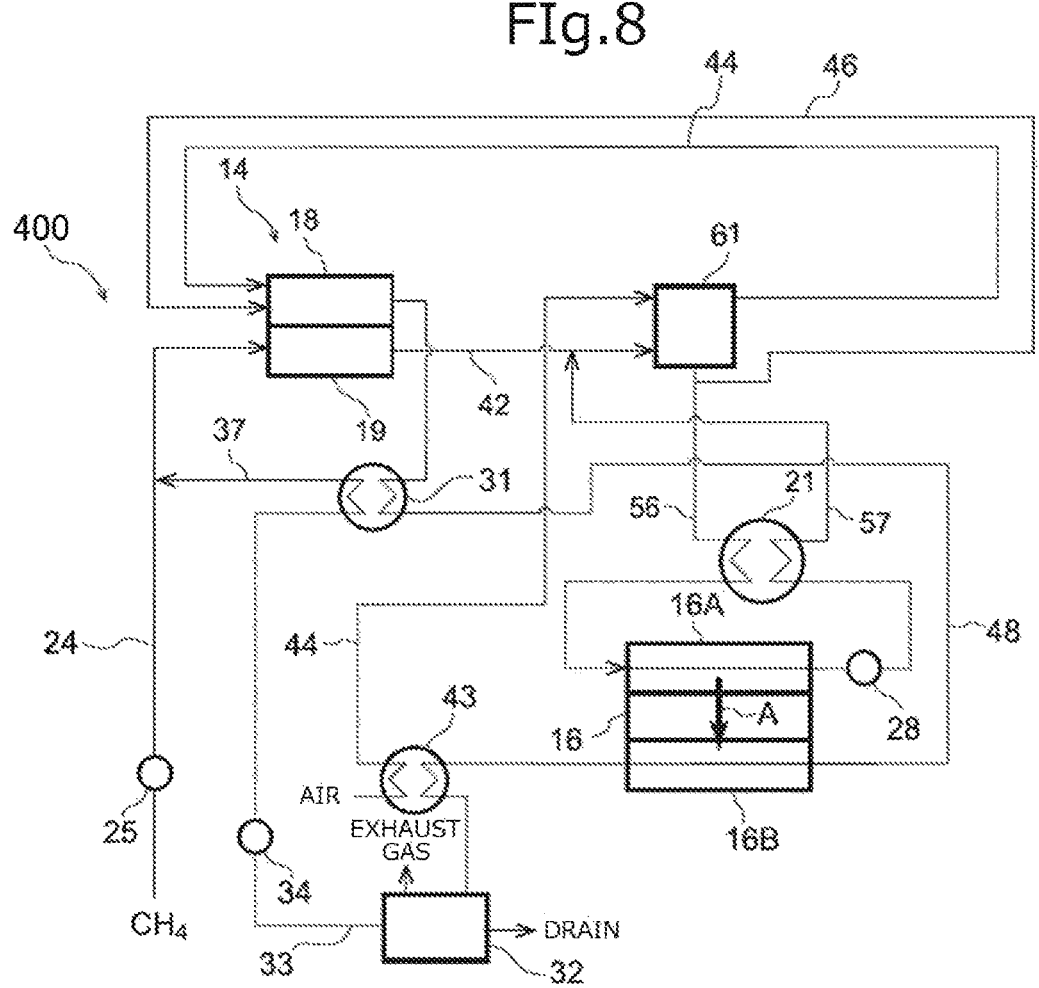
FIG. 8 is an outline configuration diagram illustrating a fuel cell system according to an eighth embodiment.

In the following description, an eighth embodiment of the fuel cell system of the invention will be explained using FIG. 8. FIG. 8 is an outline configuration diagram illustrating a fuel cell system according to the eighth embodiment. The fuel cell system 400 according to the eighth embodiment is different from the fuel cell system 40 according to the fourth embodiment, from the viewpoint that the fuel cell system 400 is a circulation type fuel cell system including a fuel cell 61.

In the fuel cell system 400, at least one of water vapor or carbon dioxide, which has been separated by the separation membrane 16, circulates in the exhaust channel 48 together with an exhaust gas. Therefore, by providing the exhaust channel 48 on the permeation side 16B of the separation membrane 16, it is not necessary to separately provide a channel for supplying a sweep gas such as air on the permeation side 16B of the separation membrane 16, and an air blower or a reduced pressure pump, the production cost is reduced, and the overall power generation efficiency of the system can be increased. Furthermore, since the system is simplified, reliability of the system is enhanced.

Ninth and Tenth Embodiments

Figure 9:
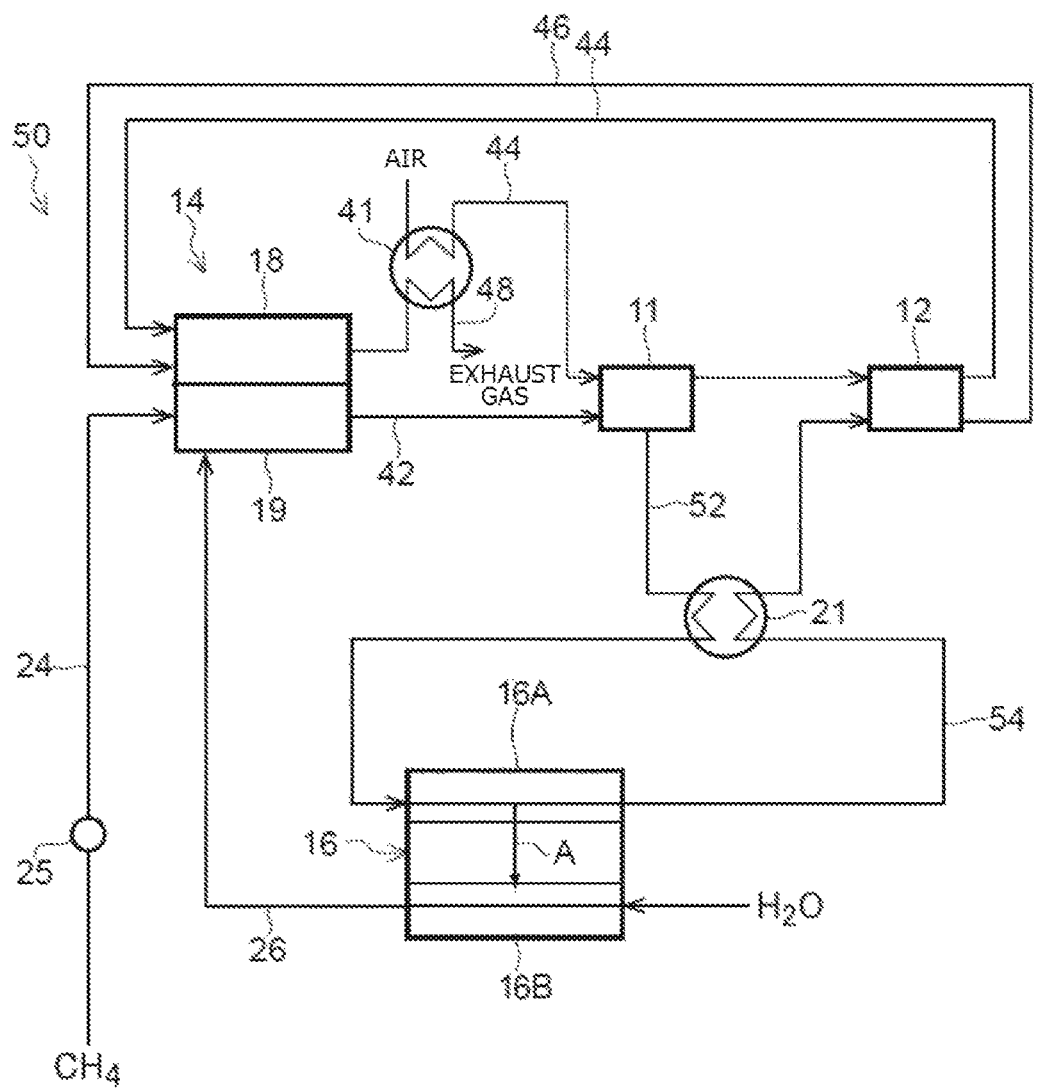
FIG. 9 is an outline configuration diagram illustrating a fuel cell system according to a ninth embodiment.
Figure 10:
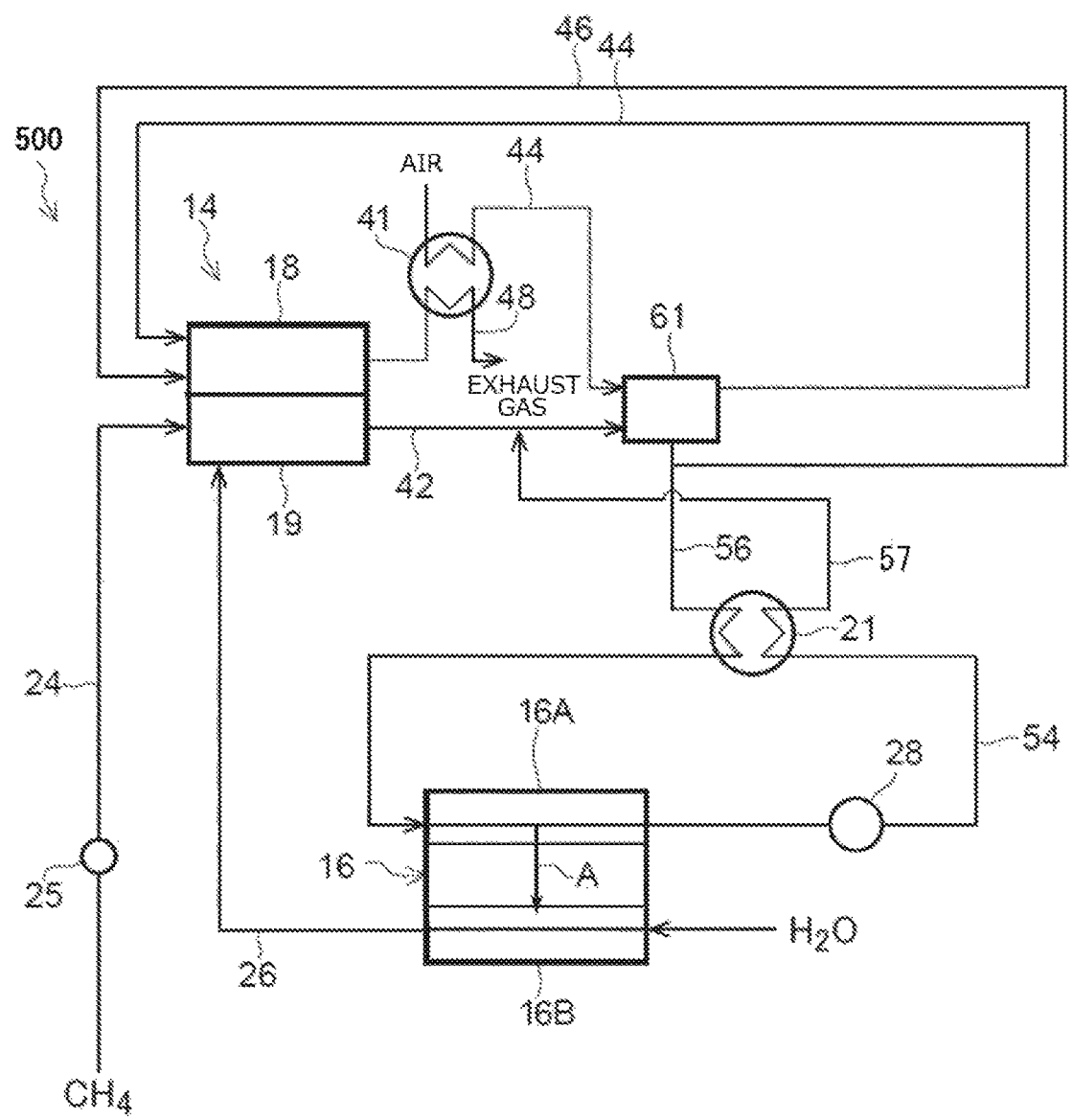
FIG. 10 is an outline configuration diagram illustrating a fuel cell system according to a tenth embodiment.

In the following description, a ninth embodiment and a tenth embodiment of the fuel cell system of the invention will be explained using FIGS. 9 and 10. FIG. 9 is an outline configuration diagram illustrating a fuel cell system according to the ninth embodiment, and FIG. 10 is an outline configuration diagram illustrating a fuel cell system according to the tenth embodiment. The fuel cell system 50 according to the ninth embodiment and the fuel cell system 500 according to the tenth embodiment are different from the fuel cell system 20 according to the second embodiment and the fuel cell system 200 according to the sixth embodiment, respectively, from the viewpoint that a water vapor supply channel 26 that supplies water vapor to the reforming unit 19 is disposed on the permeation side 16B of the separation membrane 16.

In the fuel cell system 50 and the fuel cell system 200, a water vapor supply channel 26 in which water vapor circulates is disposed on the permeation side 16B of the separation membrane 16, and at least one of carbon dioxide or water vapor, which has been separated by the separation membrane 16, is supplied to the reforming unit 19 together with the water vapor circulating in the water vapor supply channel 26 and is used for reforming of the raw material gas. Therefore, separation of at least one of carbon dioxide or water vapor can be promoted without separately providing a channel for supplying a sweep gas such as air to the permeation side of the separation membrane, and an air blower or a reduced pressure pump. Therefore, the overall power generation efficiency of the system can be increased while the production cost is reduced, and since the system is simplified, reliability of the system is enhanced.

In these embodiments, a carbon dioxide supply channel that supplies carbon dioxide to the reforming unit 19 may be disposed on the permeation side 16B of the separation membrane 16, instead of the water vapor supply channel 26.

Furthermore, instead of the water vapor supply channel 26, a water tank 32 that condenses and collects water vapor included in the exhaust gas circulating in the exhaust channel 48, a water vapor supply channel 37 that supplies water vapor originating from the condensed water stored in the water tank 32 to the reforming unit 19, or the like may be disposed, from the viewpoint of establishing water independence, by which the supply of reforming water or water vapor from the outside become unnecessary, or from the viewpoint of reducing the amount of supply of reforming water or water vapor from the outside. At this time, it is also acceptable to dispose a water vapor supply channel 37 that supplies water vapor originating from the condensed water stored in the water tank 32 to the reforming unit 19 on the permeation side 16B of the separation membrane 16, instead of the water vapor supply channel 26.

The present invention is not limited to the first embodiment to the tenth embodiment described above, and the various embodiments described above are carried out in combination by those having ordinary skill in the art, within the technical ideas of the invention. The place of installation, combination, and the like of heat exchangers are also not limited to these embodiments.

Examples of Invention

Hereinafter, the system efficiency of an exemplary fuel cell system of the invention will be explained in comparison with the system efficiency of a conventional fuel cell system.

[System Efficiency of Conventional Fuel Cell System]

As illustrated in FIGS. 3 and 4 of Japanese Patent Application Laid-Open No. 2016-115479, in regard to a multi-stage type, solid oxide fuel cell system (configuration in which two solid oxide fuel cell stacks are provided), a trial calculation was performed to find how much the open circuit voltage (OCV) of the fuel cell stacks would be increased by extracting hydrogen from an exhaust gas discharged from a fuel electrode of a first fuel cell stack of the former stage using an electrochemical hydrogen pump, that is, by separating hydrogen ($H_2$) from water ($H_2O$) and carbon dioxide ($CO_2$) in the exhaust gas using an electrochemical hydrogen pump.

In this trial calculation, as a precondition, the reaction in the first fuel cell stack of solid oxide type was performed as an equilibrium reaction at 750° C., and as an example, the S/C ratio was set to S/C=2.5. The results of the trial calculation are shown in the following Table 1.

As described above, when water and carbon dioxide are removed from the anode off gas discharged from the first fuel cell stack, the OCV of the entire fuel cell system can be increased. Here, in a case in which the system efficiency at the time when the OCV of the entire fuel cell system is 935 mV is designated as 60%, the operation voltage of the cell is considered to be properly proportional to the OCV, and the system efficiency (system efficiency of a conventional fuel cell system) at the time when the OCV of the entire fuel cell system is 969 mV is assumed to be 62.18% (60%×969/935). The itemized details of the effect of removing $H_2O$ and $CO_2$ with respect to 2.18 points of this efficiency increment are estimated to be, based on the ratio of concentrations, 1.77 points by $H_2O$ (2.18×62.8÷(62.8+14.6)) and 0.411 points by $CO_2$ (2.18×14.6÷(62.8+14.6)).

The efficiency of the fuel cell system (system efficiency) η is generally represented by the following Formula (1).

$$\eta = -(nF/\Delta H) \times V \times Uf \times \eta_{aux} \times \eta_{inv} \quad (1)$$

Here, n represents the number of reactive electrons; F represents the Faraday constant; ΔH represents the heating value; V represents the operation temperature of a solid oxide fuel battery cell; Uf represents the overall fuel utilization ratio of the system; $\eta_{aux}$ represents the auxiliary efficiency; and $\eta_{inv}$ represents the inverter efficiency. In Formula (1), -(nF/ΔH) is a value determined by the fuel, and in a case in which Uf, $\eta_{aux}$, and $\eta_{inv}$ have the same value, the system efficiency increases proportionally to the operation voltage V.

[System Efficiency of Exemplary Fuel Cell System of Invention]

Next, the system efficiency of an exemplary fuel cell system of the invention will be investigated.

Here, in a case in which hydrogen permeates to the permeation side of the separation membrane from the anode off gas discharged from the first fuel cell stack according to

TABLE 1

Effect of increasing OCV (open circuit voltage) by separating $H_2O$ and $CO_2$ from $H_2$

| | Fuel utilization efficiency (%) | | | Gas concentration of second stack (%) | | | Average OCV of second stack (mV) | OCV of entire system (mV) |
|---|---|---|---|---|---|---|---|---|
| | First stack | Second stack | Entire system | $H_2$ + CO | $CO_2$ | $H_2O$ | | |
| Conventional | 70 | 70 | 91 | 22.5 | 14.6 | 62.8 | 874 | 935 |
| Separation of $H_2O$ and $CO_2$ from $H_2$ | | | | 92.1 | 0.6 | 3.3 | 1020 | 969 |

Figure 11:
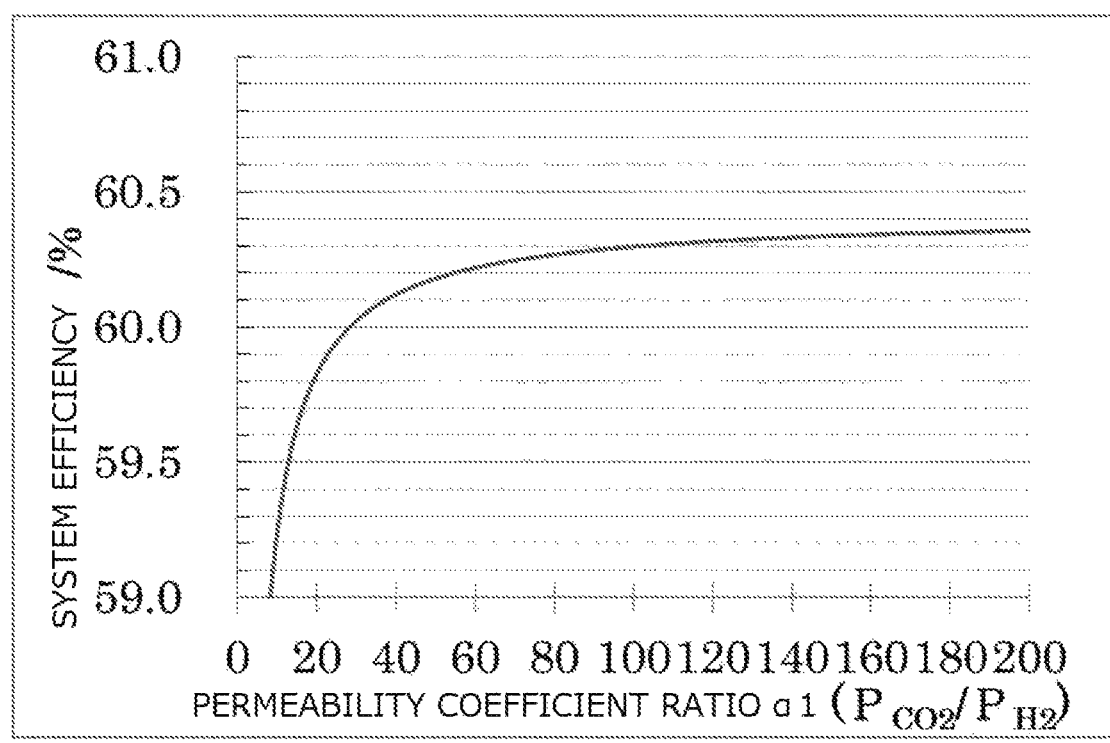
FIG. 11 is a graph showing the relationship between the permeability coefficient ratio $\alpha 1$ and the system efficiency.
Figure 12:
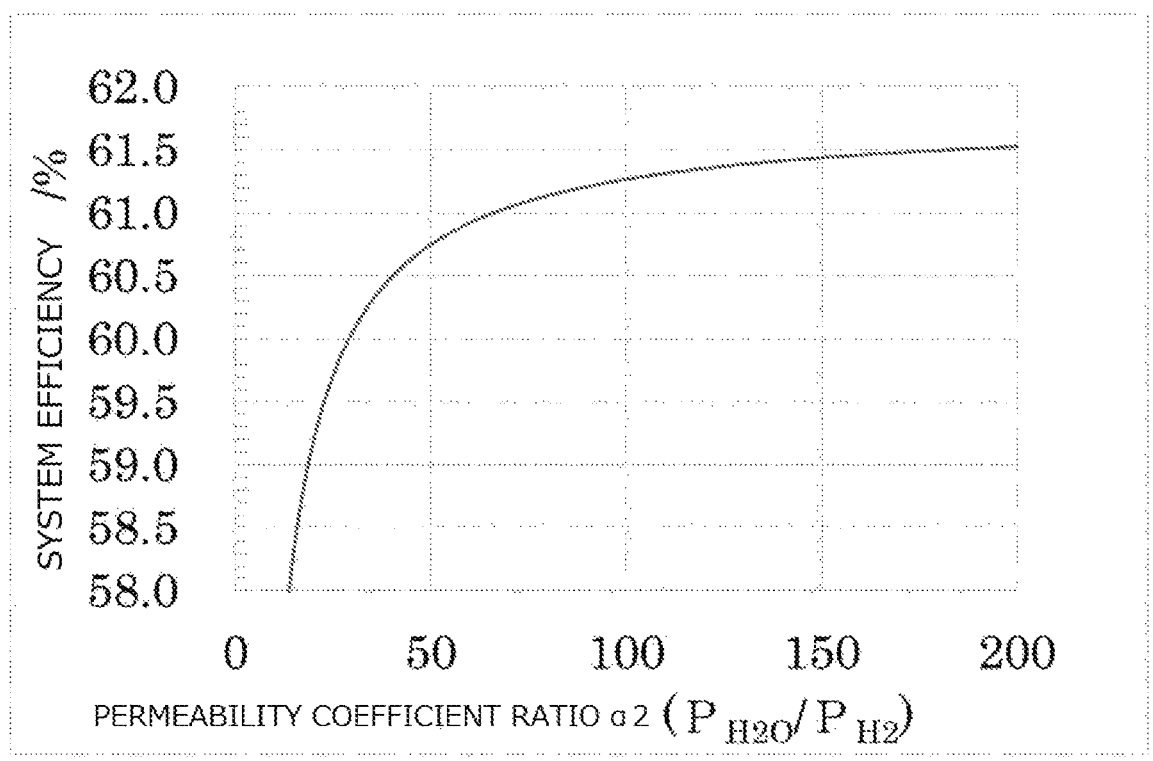
FIG. 12 is a graph showing the relationship between the permeability coefficient ratio $\alpha 2$ and the system efficiency.

The term "average OCV" in Table 1 means the average OCV at the inlet port and the outlet port of the fuel cell stacks. As is obvious from Table 1, when hydrogen ($H_2$) is separated from water ($H_2O$) and carbon dioxide ($CO_2$) in the exhaust as using an electrochemical hydrogen pump, the concentration of hydrogen ($H_2$)+carbon monoxide (CO) in the gas supplied to the second fuel cell stack increases to a large extent from 22.5% to 92.1%, while the concentration of carbon dioxide ($CO_2$) decreases from 14.6% to 0.6%, and the concentration of water ($H_2O$) decreases to a large extent from 62.8% to 3.3%. It was also found that as a gas having the above-described composition is supplied to the second fuel cell stack, the average OCV of the second fuel cell stack increases from 874 mV to 1,020 mV, and the OCV of the entire fuel cell system also increases from 935 mV to 969 mV.

the value of the permeability coefficient ratio α1 or the permeability coefficient ratio α2, the system efficiency changes as shown in FIG. 11 or FIG. 12. Here, the fuel utilization ratio of the first fuel cell stack is designated as 70%.

As shown in FIG. 11, in the case of α1=29, the system efficiency becomes 60.0%, similarly to the system efficiency of the conventional fuel cell system described above. Therefore, when α1<29, the system efficiency becomes lower than 60.0%, and it is speculated that the influence of the decrease of the system efficiency caused by $H_2$ leak, by which hydrogen permeates to the permeation side of the separation membrane, becomes larger than the influence of the increase in the system efficiency obtained by removing carbon dioxide from the anode off gas discharged from the first fuel cell stack. Therefore, in the exemplary fuel cell system of the invention, it is preferable to set such that α1>29, from the viewpoint of increasing the system efficiency.

For example, in the case of α1=57, the system efficiency becomes 60.209%. At this time, it can be said that the influence of the increase in the system efficiency (0.411 points) obtained by removing carbon dioxide from the anode off gas discharged from the first fuel cell stack is about two times larger than the influence of the decrease in the system efficiency caused by $H_2$ leak, 0.202 points (60.411−60.209).

As shown in FIG. 12, in the case of α2=29, the system efficiency becomes 60.0%, similarly to the system efficiency of the conventional fuel cell system described above. Therefore, when α2<29, the system efficiency becomes lower than 60.0%, and it is speculated that the influence of the decrease of the system efficiency caused by $H_2$ leak, by which hydrogen permeates to the permeation side of the separation membrane, becomes larger than the influence of the increase in the system efficiency obtained by removing water vapor from the anode off gas discharged from the first fuel cell stack. Therefore, in the exemplary fuel cell system of the invention, it is preferable to set such that α2>29, from the viewpoint of increasing the system efficiency.

For example, in the case of α2=57, the system efficiency becomes 60.877%. At this time, it can be said that the influence of the increase in the system efficiency (1.77 points) obtained by removing water vapor from the anode off gas discharged from the first fuel cell stack is about two times larger than the influence of the decrease in the system efficiency caused by $H_2$ leak, 0.893 points (61.77−60.877).

The disclosure of Japanese Patent Application No. 2016-227852, filed on Nov. 24, 2016, is incorporated herein in its entirety by reference.

All publications, patent applications, and technical standards mentioned in the present specification are herein incorporated by reference to the same extent as if each individual publication, patent application, or technical standard was specifically and individually indicated to be incorporated by reference.

REFERENCE SIGNS LIST

10, 20, 30, 40, 50, 100, 200, 300, 400, 500: fuel cell system, 11: first fuel cell, 12: second fuel cell, 14: reformer, 16: separation membrane, 16A: supply side, 16B: permeation side, 18: combustion unit, 19: reforming unit, 21, 22, 31, 41, 43: heat exchanger, 24: raw material gas supply channel, 25: blower, 26, 37: water vapor supply channel, 28: recycle blower, 32: water tank, 33: reforming water supply channel, 34: reforming water pump, 42: fuel gas supply channel, 44: air supply channel, 46, 52, 54: off gas channel, 48: exhaust channel, 56, 57: off gas circulation channel, 61: fuel cell

The invention claimed is:

1. A fuel cell system comprising:
a fuel cell performing power generation using a fuel gas;
a separation membrane separating at least one of carbon dioxide or water vapor from an anode off gas discharged from the fuel cell, the at least one of carbon dioxide and water vapor permeating the separation membrane from a supply side to a permeation side, wherein the anode off gas includes an unreacted portion of the fuel gas;
an off gas circulation channel disposed downstream of the separation membrane coupled with a supply side of the separation membrane and supplying the anode off gas to the fuel cell, the anode off gas having at least one of carbon dioxide or water vapor separated therefrom; and
a membrane channel disposed in the downstream of the separation membrane and coupled with a permeation side of the separation membrane,
wherein the membrane channel disposed in the permeation side of the separation membrane and coupled with a permeation side of the separation membrane is any one of the following (1) to (6): (1) a distribution channel distributing a raw material gas serving as the fuel gas to be used for the power generation of the fuel cell, (2) a distribution channel distributing a cathode gas including oxygen to be used for the power generation of the fuel cell, (3) a distribution channel distributing a cathode off gas discharged from the fuel cell, (4) an exhaust channel distributing an exhaust gas, (5) a channel distributing water vapor to be used at the time of reforming the raw material gas and thereby producing the fuel gas, or (6) a channel distributing carbon dioxide to be used at the time of reforming the raw material gas and thereby producing the fuel gas,
when the membrane channel disposed on the permeation side of the separation membrane is the exhaust channel, the fuel cell system further comprising a reformer which includes a reforming unit for reforming the raw material gas and thereby producing the fuel gas and a combustion unit for heating the reforming unit by a combustion reaction, the exhaust gas is discharged from the combustion unit to the exhaust channel, and the exhaust gas is a gas generated by burning, in the combustion unit, a mixed gas of the cathode off gas and the anode off gas discharged from the fuel cell, and
wherein at least one of permeability coefficient ratio α1 ($P_{CO2}/P_{H2}$) of the separation membrane in which the membrane channel being any one of the above (1) to (6) is disposed in the downstream or permeability coefficient ratio α2 ($P_{H2O}/P_{H2}$) of the separation membrane is 30 or higher in which the membrane channel being any one of the above (1) to (6) is disposed in the downstream.

2. The fuel cell system according to claim 1, further comprising a reformer which includes a reforming unit for reforming the raw material gas and thereby producing the fuel gas and a combustion unit for heating the reforming unit by a combustion reaction.

3. The fuel cell system according to claim 2, further comprising an exhaust channel for distributing an exhaust gas discharged from the combustion unit,
wherein the exhaust channel is disposed on the permeation side of the separation membrane instead of the distribution channel.

4. The fuel cell system according to claim 2, further comprising:
a water vapor collecting means for collecting water vapor in an exhaust gas discharged from the combustion unit; and
a water vapor supply channel for supplying the water vapor collected by the water vapor collecting means, to the reforming unit.

5. The fuel cell system according to claim 1, in a case in which the membrane channel disposed on the permeation side of the separation membrane and coupled with a permeation side of the separation membrane is the membrane channel set forth in (1) to (3), (5), or (6), further comprising a reformer which includes a reforming unit for reforming the raw material gas and thereby producing the fuel gas and a combustion unit for heating the reforming unit by a combustion reaction.

6. The fuel cell system according to claim 3, further comprising:
- a water vapor collecting means for collecting water vapor in an exhaust gas discharged from the combustion unit; and
- a water vapor supply channel for supplying the water vapor collected by the water vapor collecting means, to the reforming unit.

7. The fuel cell system according to claim 1, wherein at least one of permeability coefficient ratio β1 ($P_{CO_2}/P_{CO}$) of the separation membrane or permeability coefficient ratio β2 ($P_{H_2O}/P_{CO}$) of the separation membrane is 6 or higher.

8. The fuel cell system according to claim 1, wherein at least one of the permeability coefficient ratio α1 ($P_{CO_2}/P_{H_2}$) of the separation membrane or the permeability coefficient ratio α2 ($P_{H_2O}/P_{H_2}$) of the separation membrane is 60 or higher.

9. The fuel cell system according to claim 2, further comprising a channel distributing at least one of water vapor or carbon dioxide to be used at the time of reforming the raw material gas and thereby producing the fuel gas,
wherein the channel is disposed on the permeation side of the separation membrane instead of the distribution channel.

10. The fuel cell system according to claim 2, wherein at least one of permeability coefficient ratio β1 ($P_{CO_2}/P_{CO}$) of the separation membrane or permeability coefficient ratio β2 ($P_{H_2O}/P_{CO}$) of the separation membrane is 6 or higher.

11. The fuel cell system according to claim 2, wherein at least one of the permeability coefficient ratio α1 ($P_{CO_2}/P_{H_2}$) of the separation membrane or the permeability coefficient ratio α2 ($P_{H_2O}/P_{H_2}$) of the separation membrane is 60 or higher.

12. The fuel cell system according to claim 3, wherein at least one of permeability coefficient ratio β1 ($P_{CO_2}/P_{CO}$) of the separation membrane or permeability coefficient ratio β2 ($P_{H_2O}/P_{CO}$) of the separation membrane is 6 or higher.

13. The fuel cell system according to claim 4, wherein at least one of permeability coefficient ratio β1 ($P_{CO_2}/P_{CO}$) of the separation membrane or permeability coefficient ratio β2 ($P_{H_2O}/P_{CO}$) of the separation membrane is 6 or higher.

14. The fuel cell system according to claim 1, wherein the membrane channel disposed in the permeation side of the separation membrane and coupled with a permeation side of the separation membrane is any one of the (2), (3), (5), and (6).

* * * * *